US012025467B2

United States Patent
Müller et al.

(10) Patent No.: US 12,025,467 B2
(45) Date of Patent: Jul. 2, 2024

(54) SURVEYING SYSTEM AND AUXILIARY MEASURING INSTRUMENT

(71) Applicant: LEICA GEOSYSTEMS AG, Heerbrugg (CH)

(72) Inventors: Josef Müller, Oberegg (CH); Jochen Scheja, Hohenems (AT); Oliver Faix, Diepoldsau (CH); Thomas Bösch, Lustenau (AT); Claudio Iseli, Au (CH)

(73) Assignee: LEICA GEOSYSTEMS AG, Heerbrugg (CH)

( * ) Notice: Subject to any disclaimer, the term of this patent is extended or adjusted under 35 U.S.C. 154(b) by 402 days.

(21) Appl. No.: 17/526,989

(22) Filed: Nov. 15, 2021

(65) Prior Publication Data
US 2022/0074764 A1 Mar. 10, 2022

Related U.S. Application Data

(63) Continuation-in-part of application No. 17/290,218, filed as application No. PCT/EP2018/079910 on Oct. 31, 2018.

(51) Int. Cl.
| | |
|---|---|
| *G01C 25/00* | (2006.01) |
| *G01C 15/00* | (2006.01) |
| *G01C 15/06* | (2006.01) |
| *G06T 7/70* | (2017.01) |
| *G06T 7/80* | (2017.01) |

(52) U.S. Cl.
CPC .......... *G01C 25/00* (2013.01); *G01C 15/002* (2013.01); *G01C 15/06* (2013.01); *G06T 7/70* (2017.01); *G06T 7/80* (2017.01)

(58) Field of Classification Search
CPC ...... G01C 25/00; G01C 15/002; G01C 15/06; G06T 7/70
USPC .................................................. 33/293–296
See application file for complete search history.

(56) References Cited

U.S. PATENT DOCUMENTS

| | | | |
|---|---|---|---|
| 5,337,149 A | 8/1994 | Kozah et al. | |
| 5,893,214 A | 4/1999 | Meier et al. | |
| 7,541,974 B2 * | 6/2009 | Scherzinger | G01C 15/06 |
| | | | 701/472 |

(Continued)

FOREIGN PATENT DOCUMENTS

| | | |
|---|---|---|
| CN | 102778893 A | 11/2012 |
| CN | 103477187 A | 12/2013 |

(Continued)

OTHER PUBLICATIONS

Extended Search Report from corresponding EP Application No. 21210064, Feb. 28, 2022.

(Continued)

*Primary Examiner* — George B Bennett
(74) *Attorney, Agent, or Firm* — Maschoff Brennan

(57) ABSTRACT

A calibrating method and system for an auxiliary measuring instrument which is designed to form together with a ground-based, stationary, surveying device having range-and-direction measuring functionality, a total station, a system for surveying and/or staking out object points. The auxiliary measuring instrument including a body which has a code for determining the orientation by using a pivoting movement of the body about a resting contact end of the auxiliary measuring instrument.

17 Claims, 12 Drawing Sheets

(56) References Cited

U.S. PATENT DOCUMENTS

| | | | |
|---|---|---|---|
| 8,503,053 B2 * | 8/2013 | Graham | G01C 15/02 |
| | | | 359/200.1 |
| 8,902,408 B2 * | 12/2014 | Bridges | G01S 7/497 |
| | | | 367/27 |
| 9,222,771 B2 * | 12/2015 | Rosengaus | G01C 15/002 |
| 9,377,298 B2 | 6/2016 | Zogg et al. | |
| 9,377,301 B2 | 6/2016 | Neier et al. | |
| 9,497,383 B2 | 11/2016 | Lienhart | |
| 9,594,167 B2 | 3/2017 | Zogg et al. | |
| 9,720,087 B2 | 8/2017 | Christen et al. | |
| 9,772,185 B2 | 9/2017 | Metzler | |
| 9,816,813 B2 | 11/2017 | Lettau et al. | |
| 9,958,269 B2 | 5/2018 | Metzler et al. | |
| 10,240,924 B2 | 3/2019 | Metzler | |
| 10,337,865 B2 | 7/2019 | Green et al. | |
| 10,488,519 B2 | 11/2019 | Nishita | |
| 10,713,607 B2 | 7/2020 | Pettersson et al. | |
| 10,921,430 B2 | 2/2021 | Ohtomo et al. | |
| 11,048,898 B2 | 6/2021 | Suman et al. | |
| 11,313,680 B2 | 4/2022 | Kumagai | |
| 11,333,497 B2 | 5/2022 | Eisenreich et al. | |
| 11,435,182 B2 | 9/2022 | Hajmousa et al. | |
| 11,493,341 B2 | 11/2022 | Müller et al. | |
| 11,506,492 B2 * | 11/2022 | Nakaniwa | G01C 15/06 |
| 11,536,568 B2 * | 12/2022 | Nishita | G01C 15/06 |
| 11,785,683 B2 | 10/2023 | Comini et al. | |
| 2008/0036646 A1 | 2/2008 | Green et al. | |
| 2012/0124850 A1 | 5/2012 | Ortleb et al. | |
| 2013/0093882 A1 | 4/2013 | Kotzur et al. | |
| 2013/0176305 A1 | 7/2013 | To et al. | |
| 2014/0343890 A1 | 11/2014 | Lettau et al. | |
| 2014/0373369 A1 | 12/2014 | Bockem | |
| 2015/0219451 A1 | 8/2015 | Pettersson et al. | |
| 2022/0011105 A1 | 1/2022 | Hotz et al. | |
| 2022/0252396 A1 | 8/2022 | Kikuchi | |
| 2022/0364861 A1 * | 11/2022 | Rothbucher | G01C 15/02 |
| 2023/0314618 A1 | 10/2023 | Metzler | |

FOREIGN PATENT DOCUMENTS

| | | |
|---|---|---|
| CN | 103782132 A | 5/2014 |
| CN | 104142122 A | 11/2014 |
| CN | 104142505 A | 11/2014 |
| CN | 104583709 A | 4/2015 |
| CN | 104769454 A | 7/2015 |
| CN | 105358937 A | 2/2016 |
| CN | 107220741 A | 9/2017 |
| CN | 108604285 A | 9/2018 |
| DE | 19602327 A1 | 7/1997 |
| DE | 102008001617 A1 | 11/2009 |
| DE | 102010024014 A1 | 12/2011 |
| EP | 1130355 A2 | 9/2001 |
| EP | 1645846 A1 | 4/2006 |
| EP | 2405236 B1 | 1/2012 |
| EP | 2 570 768 A1 | 3/2013 |
| EP | 2594895 A2 | 5/2013 |
| EP | 2 765 388 A1 | 8/2014 |
| EP | 2 787 322 A1 | 10/2014 |
| EP | 3333538 A1 | 6/2018 |
| EP | 3415866 A1 | 12/2018 |
| JP | 2002528709 A | 9/2002 |
| JP | 2007-281672 A | 10/2007 |

OTHER PUBLICATIONS

EP Office Action dated Jun. 19, 2023 as received in Application No. 21210064.8.
Written Opinion in Application No. PCT/EP2018/079910 dated Sep. 23, 2019.
International Search Report in Application No. PCT/EP2018/079910 dated Sep. 23, 2019.
CN Office Action dated Dec. 28, 2023 as received in Application No. 202111508071.9.
CN Office Action dated Jan. 31, 2024 as received in Application No. 202111508055.X.

* cited by examiner

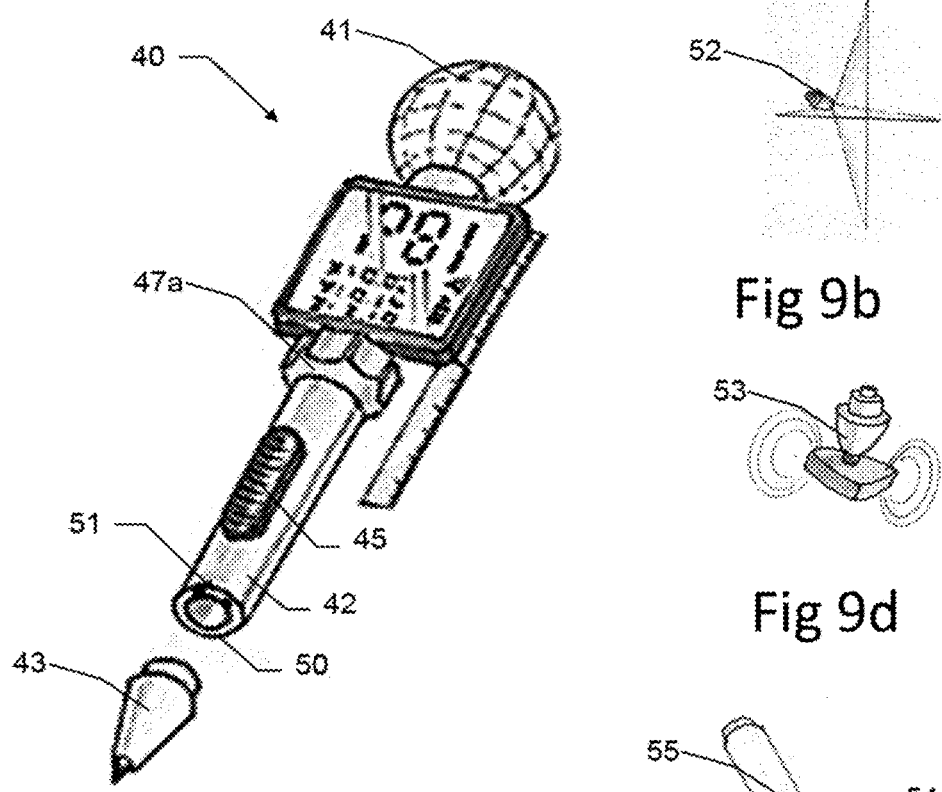
Fig 9a
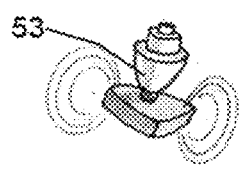
Fig 9b
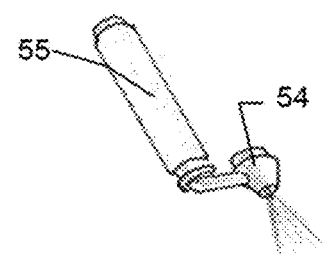
Fig 9d
Fig 9c
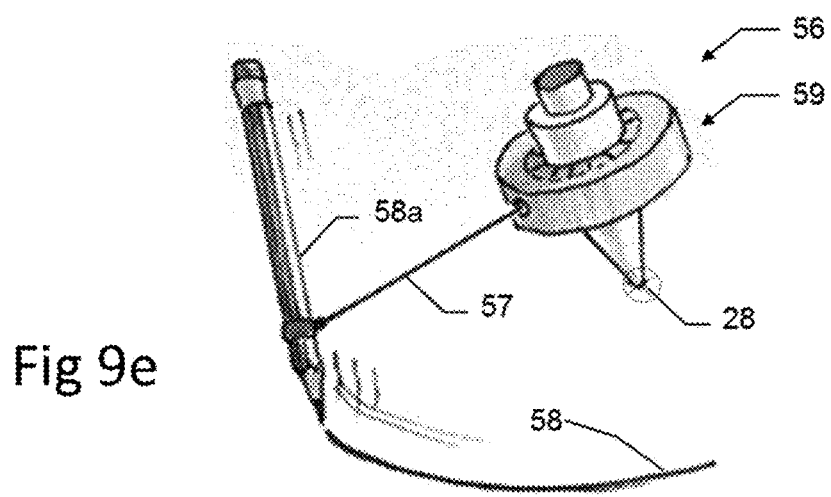
Fig 9e

SURVEYING SYSTEM AND AUXILIARY MEASURING INSTRUMENT

CROSS-REFERENCE TO RELATED APPLICATIONS

This application claims priority to U.S. patent application Ser. No. 17/290,218, which is the U.S. National Stage of International Application No. PCT/EP2018/079910, filed on Oct. 31, 2018, both of which are incorporated by reference in their entirety.

FIELD OF THE INVENTION

The present disclosure relates to an auxiliary measuring instrument, a surveying system or surveying device and a position-determining or marking method.

BACKGROUND

Surveying systems for determining positions in the field of geodesy or the area of construction sites and/or construction are known in manifold forms. Examples of these are systems made up of a stationary surveying device with a direction and range meter, such as for example a total station, and an auxiliary measuring instrument marking a point to be surveyed or identified, such as for example a plumbing pole. Also known are layout systems made up of a stationary laser emitter, which by means of a laser beam generates a position reference, which can be received by a laser receiver at the point to be marked. Surveying activities are thus performed by the interaction of a stationary device at a known location, which thus offers a position reference, with a receiving or marking and/or targetable measuring aid, whereby the position of individual terrain points such as land surveying points or points on construction site objects, for example in the interior or exterior area of buildings or in road construction, can be determined precisely with respect to position measurement or stake out.

BRIEF SUMMARY

The object of the present invention is to provide an improved surveying system or improved system device and improved surveying method.

This object is achieved by the implementation of the characterizing features of the independent claims. Features which refine the invention in an alternative or advantageous manner can be inferred from the dependent patent claims and the description, including the descriptions of the figures. All of the embodiments of the invention that are shown or otherwise disclosed in this document can be combined with one another unless otherwise expressly stated.

A first aspect of some aspects of the invention relate to an auxiliary measuring instrument, in particular a surveying pole or plumbing pole, which is designed to form together with a ground-based, in particular stationary, surveying device having range-and-direction measuring functionality, in particular a total station, a system for surveying and/or staking out terrain points. "Terrain point" should be understood here in a broad sense and comprises for example not only points on open or free terrain, but also points of or on buildings or construction sites, both in the interior area and exterior area. The auxiliary measuring instrument has a handheld main body with a defined longitudinal axis, so that the auxiliary measuring instrument can be used as a handy means for aiming at a terrain point. The auxiliary measuring instrument is designed for example as a pole, the one end of which can be positioned on the terrain point. Solutions in which the point is not aimed at physically, but for example by the measuring beam of a distance meter, are also known from the prior art and included here. In any event, a distance from a, in particular reference point of the main body to the terrain point is predefined or given or can be determined by the auxiliary measuring instrument itself.

Furthermore, the auxiliary measuring instrument has a target, which is attached to the main body in a defined and known spatial relationship with the longitudinal axis and with the reference point and the position of which can be determined by the surveying device, so that, by targeting at the terrain point with the measuring instrument, a target position linked with the terrain point can be displayed.

Furthermore, the auxiliary measuring instrument has on the main body, in a defined and known spatial relationship with the longitudinal axis, an attached body, preferably a sphere attachment, in particular wherein the center of the body is arranged on the longitudinal axis. The body bears on its surface a two-dimensional code, which can be bijectively evaluated by image processing, so that an orientation of the attachment, and consequently (with knowledge of the defined and known relationship) the orientation (roll, pitch and yaw angles) of the auxiliary measuring instrument can be determined.

Optionally, the code is designed and distributed over the surface of the body in such a way that the orientation of the auxiliary measuring instrument can be bijectively determined on the basis of a segment of the surface of the body, and consequently the code, recorded in a camera image.

As a further option, the code has at least a first and second resolution stage, wherein the first resolution stage is designed for image recording and code evaluation in the near range and the second resolution stage is designed for image recording and code evaluation in the far range and/or the first resolution stage serves for coarse inclination and orientation determination and the second resolution stage serves for fine inclination and orientation determination. For example, the code has precisely three resolution stages.

In a further development, the code is arranged in two parts on the surface of the sphere, in that a first part serves for coding a first direction on the surface of the sphere, in particular the length or the longitude, and a second part serves for coding a second direction, in particular the width or the latitude, in particular wherein the first part and the second part are of different colors, for example red and green. Color is understood here as also meaning colors that lie outside the visible range, for example in the near IR spectrum or in the UV range.

Optionally, the target is integrated in the sphere attachment, for example in that the surface of the sphere has a multiplicity of retroreflectors which can be aimed at by the surveying device. As a further option, the auxiliary measuring instrument has a light source, with which the surface of the sphere can be illuminated, in particular wherein the light source is arranged in the interior of the sphere attachment. As a further option, the light source can be activated in such a way that, by varying the illumination, for example changing the color and/or intensity (for example flashing), a transmission of information is made possible, for example to the surveying device. Thus, for example, the current status of the surveying device, for example the readiness for use or an ID, can be communicated by means of a light signal or instructions to a user can be given on the surveying device.

As an additional or alternative, the sphere attachment has at least one outer layer of unbreakable, in particular elastic, material and is arranged on the main body, and sufficiently largely dimensioned, in such a way that damage to the auxiliary measuring instrument in the event of impact is minimized or prevented by the sphere attachment.

Some aspects of the invention also relate to a ground-based, for example geodetic, surveying system with a, in particular stationary, surveying device having range-and-direction measuring functionality, in particular a total station, and an auxiliary measuring instrument as described above, wherein the surveying device has a camera, by means of which a two-dimensional image at least of a segment of the surface of the sphere attachment can be recorded, and the system has a decoding instruction (a decoding algorithm or decoding information), stored in a memory, for decoding the code and also a controller with decoding functionality, which is designed to evaluate the camera image on the basis of the decoding information in such a way that an orientation of the auxiliary measuring instrument can be bijectively determined.

In a development of the surveying system, the controller is designed in such a way that, as part of the decoding functionality, a circle is fitted to the depiction of the sphere in the camera image, the center of the depiction of the sphere is ascertained by means of the fitted circle and the code that is present in a surface segment situated around the center is decoded.

Optionally, the surveying device of the surveying system has a base, a targeting unit, in particular a telescopic sight, which defines a target direction and can be pivoted with respect to the base about at least one axis, in particular two axes orthogonal to one another, for aiming at the target, at least one angle meter and also an angle-measuring functionality for measuring the target direction, a range meter for measuring a range from the target in the target direction, and a controller with single-point determining functionality, in the execution of which, controlled by the controller, a position of a terrain point designated with the aid of the auxiliary measuring instrument within an area of terrain is determined on the basis of the measured target direction, the range between the target and the surveying device and the inclination and orientation of the auxiliary measuring instrument determined on the basis of the sphere attachment.

Optionally, the targeting unit of such a surveying device has a beam source for generating a measuring radiation, preferably laser radiation, and also has an optical unit for emitting the measuring radiation as a free beam in the target direction and an electro-optical detector for detecting measuring radiation reflected by the target, from which the range from the target can be determined, wherein, in the execution of the single-point determining functionality, the target of the auxiliary measuring instrument is aimed at by means of setting the target direction, so that measuring radiation hits the target, and the range between the target and the surveying device is determined by means of the measuring radiation.

As a further option, the surveying system has a drive for automatically changing the target direction and a target-tracking functionality, so that, on activation of the target-tracking functionality, the target direction automatically follows a moving auxiliary measuring instrument, wherein the target-tracking functionality is based on an evaluation of the camera image of the sphere attachment, in particular wherein, as part of the target-tracking functionality, images of the sphere attachment are continuously recorded and the target direction is continuously changed in such a way that the depiction of the sphere is kept at the center of the images.

Optionally, the code is designed in such a way that the code can be bijectively evaluated irrespective of the range of the surveying device from the auxiliary measuring instrument (of course within certain limits or up to a maximum distance). For example, the camera of the surveying device is then equipped with an autofocus, in order to produce a sharp image of the code automatically, irrespective of the distance.

Some aspects of the invention also relate to a method for determining the position of a terrain point with the steps of aiming at the terrain point with an auxiliary measuring instrument as described above, measuring the range from and direction in relation to the target provided by the auxiliary measuring instrument during the aiming at the terrain point from a ground-based surveying device, in particular a total station, providing the distance between the target and the terrain point (that is to say knowing the previously fixed distance and/or measuring a variable distance, for example by means of a laser distance meter of the auxiliary measuring instrument), determining the inclination and orientation of the auxiliary measuring instrument by means of image evaluation of a camera image, in which at least part of the body provided with a 2D code is depicted, and determining the position of the terrain point, starting from a known position of the surveying device, on the basis of the range and direction, the distance and the orientation.

Optionally, the method includes tracking of the auxiliary measuring instrument on the basis of a series of images of the attached body recorded by the surveying device, for example in that in each case a deviation of the position in the camera image of the sphere from an ideal position (for example center of the image) is determined and, on the basis of the deviations, the alignment of the surveying device is continuously changed, that is to say the target direction is made to track the movement of the auxiliary measuring instrument.

Some aspects of the present invention also includes a computer program product or a computer data signal, which is embodied by an electromagnetic wave, with program code, for controlling or carrying out the method according to the invention for determining the position of a terrain point with an auxiliary measuring instrument described above with sphere coding, in particular when the program is executed in a controlling and evaluating unit of a surveying system according to the invention.

In a further aspect, some aspectse of the invention relate to a ground-based, in particular geodetic, surveying system for surveying and/or staking out terrain points with a, in particular stationary, surveying device having range-and-direction measuring functionality, in particular a total station, and an auxiliary measuring instrument, wherein the surveying device has a base, targeting unit, in particular a telescopic sight, which defines a target direction and can be pivoted with respect to the base about at least one axis, in particular two axes orthogonal to one another, a range meter and also a range-measuring functionality for measuring a range from the target in the target direction, and at least one angle meter and also an angle-measuring functionality for measuring the target direction. The auxiliary measuring instrument has a handheld rod, the one end of which is intended for physically contacting a terrain point, and a target, which is attached to the rod, in particular at the other end, and can be aimed at by the surveying device, wherein the target is attached to the rod at a distance from the contact end that is defined and stored in a memory of the surveying system, so that a target position linked with the terrain point can be provided by contacting the terrain point with the contact end.

Furthermore, the surveying system has a controller with evaluating functionality, wherein, as part of the evaluating functionality, the target position can be determined on the basis of the target direction and the range between the target and the surveying device, and the controller has a calotte measuring functionality for determining the position of a terrain point, wherein, in the execution of the calotte measuring functionality, on the basis in each case of the target direction and the range, at least three non-coplanar target positions linked with the terrain point are determined, wherein the non-coplanar target positions are provided for example by at least three different alignments or inclinations of the rod of the auxiliary measuring instrument contacting the terrain point. Furthermore, as part of the calotte measuring functionality, a calotte together with an associated sphere center point is calculated on the basis of the three target positions and the stored distance between the target and the contact end, and the sphere center point is adopted as the position of the terrain point. As an alternative, the target need not be attached at a defined, known distance from the contact end, in that the calotte calculation is not based on three, but at least four, non-coplanar target positions. A possibly known distance between the target and the terrain point can then be optionally used for increasing the robustness of the calotte calculation or point determination or for verifying the result of the calculation.

Optionally, the target of the auxiliary measuring instrument is retroreflective and the targeting unit has a beam source for generating a measuring radiation and an optical unit for directionally emitting the measuring radiation as a free beam in the target direction and also an electro-optical detector for detecting measuring radiation reflected by the target, so that the range from the target used for determining the position of the target can be determined on the basis of detected measuring radiation.

As a further option, the auxiliary measuring instrument has a user display and the controller is designed in such a way that, as part of the calotte functionality, an instruction with respect to pivoting the auxiliary measuring instrument for generating the non-coplanar target positions, in particular with respect to an optimum, in particular homogeneous and/or large-area, arrangement of the target positions, is displayed to a user on the user display.

In a development, the instruction is provided on the basis of a camera image of the auxiliary measuring instrument and its surrounding area when contacting the terrain point, wherein the camera image is recorded by means of a camera of the surveying device. Optionally, on the basis of the camera image, an ascertainment of a pivoting area to be excluded, which is unsuitable, in particular impossible, for an aiming of the contacting auxiliary measuring instrument by means of the surveying device, is performed, and/or an ascertainment of an optimum pivoting area, which is particularly well-suited for an aiming of the contacting auxiliary measuring instrument by means of the surveying device, is performed. As an alternative or in addition, the instruction or user prompting is based on at least the first determined target position.

As a further option, the instruction takes place graphically, in that a graphic indication of a pivoting area and/or individual pivoting positions with respect to a pivoting movement to be executed of the contacting auxiliary measuring instrument takes place on the user display (for example recommended and/or unfavorable ranges or positions). For example, the graphic indication is embedded in a camera-image-based depiction (that is to say a camera image or else a virtual depiction calculated therefrom) of the surrounding area of the contacting auxiliary measuring instrument, wherein the camera image is recorded by means of a camera of the surveying device and/or shows a perspective of the user of the auxiliary measuring instrument and/or its location.

Optionally, the target positions are kept in a temporary memory of the surveying system and are abandoned or erased after completion of the determination of the terrain point.

The invention also relates to a method for determining the position of a terrain point by means of a surveying system described above with calotte measuring functionality, wherein the method comprises the following steps: contacting the terrain point with the contact end of the auxiliary measuring instrument, pivoting the contacting auxiliary measuring instrument, so that at least three different target positions linked with the terrain point are provided, determining the at least three target positions by means of the surveying device, calculating a calotte on the basis of the at least three target positions and the known distance between the target and the contact end of the auxiliary measuring instrument by calculating the sphere center point associated with the calotte, whereby the position of the terrain point is determined by the sphere center point, or the steps of: contacting the terrain point with the contact end of the auxiliary measuring instrument, pivoting the contacting auxiliary measuring instrument, so that at least four different target positions, linked with the terrain point, are provided, determining the at least four target positions by means of the surveying device, calculating a calotte on the basis of the at least four target positions by calculating the sphere center point associated with the calotte, whereby the position of the terrain point is determined by the sphere center point.

Optionally, during the pivoting, automatic target tracking and automatic determination of the target position are performed by the surveying device.

As a further option, an output of a warning to a user takes place if the determination of the target positions is inadequate or impossible on account of absent or inadequate capability of aiming at the target by the surveying device.

In a development of the method, an automatic or user-side assessment of the quality of the position of the terrain point takes place is performed, wherein, with the quality assessed as insufficient, renewed or additional determination of target positions takes place. In this case, an automatic generation of a measure of quality, which is based on an overdetermination of the calculated calotte (for example overdetermination due to the presence of more than the three or four necessary positioning points or due to knowledge of the actual distance between the target and the contact point) optionally takes place is performed for the assessment. As a further option, for a user-side assessment, a graphic representation based on the position of the terrain point is generated.

As a further option, an automatic ending of the determination of target positions takes place is performed as soon as a predefined termination criterion is satisfied, in particular a maximum period of time has elapsed, a required accuracy has been achieved and/or a minimum number of target positions has been determined.

Optionally, the determination of target positions and calculation of the calotte proceed simultaneously in such a way that the calculation is performed as soon as there are a minimum number of target positions and further target positions serve for the continuous updating and/or refinement of the calculated calotte.

Some aspects of the present invention also includes a computer program product or a computer data signal, which is embodied by an electromagnetic wave, with program code, for controlling or carrying out the method according to the invention for determining the position of a terrain point by means of calotte calculation or calotte measuring functionality, in particular when the program is executed in a controlling and evaluating unit of a surveying system according to the invention.

In a third aspect, the invention relates to an auxiliary measuring instrument which is designed to form together with a ground-based, in particular stationary, surveying device having range-and-direction measuring functionality, in particular a total station, a system for, in particular geodetically, surveying and/or marking out object points. The auxiliary measuring instrument has a handheld main body of a defined length, and at least one element which is arranged in a defined manner on the main body and is designed to measure the position and orientation of the auxiliary measuring instrument in interaction with the surveying device. For this, a body, in particular a sphere, is attached at a second end of the auxiliary measuring instrument. The body is in this case intended for the optical-image-based determination of the position of the auxiliary measuring instrument by the surveying device.

Preferably, the body is the bearer of a 2D code on its surface and is in this case designed in such a way that an orientation and range of the spherical attachment, and consequently the auxiliary measuring instrument, can be determined (by the surveying device) by image evaluation of a camera image of the 2D code and on the basis of stored decoding information, for example in a memory of the surveying device. Together with a measured direction with respect to the auxiliary measuring instrument, the distance gives the position of the auxiliary measuring instrument in space or in relation to the surveying device, so that altogether the location (orientation and position, six degrees of freedom) of the auxiliary measuring instrument can be determined on the basis of the body.

Moreover, the auxiliary measuring instrument has a man-machine interface.

Moreover, the auxiliary measuring instrument is designed in a pen-like form and size, wherein an object point to be surveyed or marked out can be aimed at in a one-handed manner with a first end of the auxiliary measuring instrument.

Preferably, the auxiliary measuring instrument can be ergonomically held and guided with one hand, in particular for which the main body has indentations and/or bulges adapted to the human hand, in particular a gripping region for at least the thumb and index finger, and in particular also the middle finger, of a user, and/or the mass distribution of the auxiliary measuring instrument is adapted in such a way that its centroid satisfies ergonomic aspects.

Optionally, the auxiliary measuring instrument has an inertial measuring unit (IMU), so that the location of the auxiliary measuring instrument can be completely determined by a combination of measurement data of the inertial measuring unit and position data determined on the basis of the body.

As a further option, the first end is designed as a probe ball with electronic and/or mechanical correction of the measuring offset on the basis of the size of the probe ball. In this case, the correction preferably takes place by the probe ball being attached in such a way that, for measuring an object point, the probe ball is deflected exactly about the radius of the probe ball.

Optionally, the first end is designed as a self-triggering sensor tip, which on contact automatically triggers a measurement. Optionally, the end is exchangeable, in that the main body has a holder (connecting piece), which is intended for receiving different tool and/or sensor tips, in particular wherein the holder has a sensor system, which serves for automatically identifying the respective tip. Optionally, in the course of the identification, an identification of the length of the tip takes place, i.e. the measuring system is automatically notified of the measuring or marking point of the tip.

As a further option, the tool and/or sensor tip is designed as a marking pen, in particular a felt pen, pencil or crayon, and/or an active tool tip, in particular a printer and/or a sprayer and/or a marking laser, in particular a line laser, and/or is designed as a sensor tip, in particular a (touch) probe and/or a metal detector, a line finder (for example with a function for the active modulation of a signal onto the line) and/or a laser distance meter.

Optionally, the man-machine interface has a touch-sensitive display and/or a scroll wheel and/or a microphone (for voice control) and/or a lighting means for visual user information and/or a button. Such a button is optionally designed as a triggering button that is separately formed and/or separately arranged on the main body, wherein the triggering button is intended for triggering the position and orientation measurement of the auxiliary measuring instrument and/or the auxiliary measuring instrument has an active tool tip and/or sensor tip and the triggering button is intended for triggering an action of the tool tip (for example marking) and/or a measurement with the sensor tip.

As a further option, the auxiliary measuring instrument has a, in particular removable, measuring tape of variable length, in particular with an arresting function, wherein the measuring tape is intended for circular constructions, in particular so that the center point of the circle lies on the longitudinal axis.

In a development, the at least one element intended for the position and orientation measurement is designed as a sphere attachment, which bears on its surface a two-dimensional code, which can be bijectively evaluated by image processing of an image recorded with a camera of the surveying device.

Optionally, the length of the auxiliary measuring instrument is is variable in a defined manner, in particular in that the main body has at its one end, defined by the longitudinal axis, a holder for receiving pole-shaped extension pieces, in particular wherein the holder has a sensor system which serves for the automatic identification of the respective extension piece, and/or the main body is telescopically designed, so that its length is variable, in particular steplessly, wherein the respectively applicable length can be measured by means of a position encoder of the auxiliary measuring instrument or an integrated electronic distance meter, which is for example arranged in an inner cavity.

As a further option, the auxiliary measuring instrument has a communications interface, in particular an IRDA or BLT interface, in order thereby to communicate with the surveying device.

The invention also relates to a ground-based surveying system with a, in particular stationary, surveying device having range-and-direction measuring functionality, in particular a total station, and a pen-like auxiliary measuring instrument as described above.

Optionally, the surveying device of the system has a base, a targeting unit, in particular a telescopic sight, which defines a target direction and can be pivoted with respect to the base about at least one axis, in particular two axes orthogonal to one another, in particular wherein the targeting unit has a beam source for generating a measuring radiation and also an optical unit for directionally emitting the measuring radiation as a free beam, at least one angle meter and also an angle-measuring functionality for measuring the target direction, and a controller with single-point determining functionality, in the execution of which, controlled by the controller, a position of an object point designated with the aid of the auxiliary measuring instrument within an area of terrain is determined.

The invention also relates to a method for determining the position and/or marking a terrain point with the steps of aiming at the object point with a pen-like auxiliary measuring instrument as described above, determining the position and orientation of the auxiliary measuring instrument during the aiming at the object point by means of a ground-based surveying device, in particular a total station, determining the position and/or marking the object point (marking and/or surveying), starting from a known position of the surveying device, on the basis of the determined position and orientation of the auxiliary measuring instrument.

Optionally, in the course of the method, a continuous determination of the position and orientation of the auxiliary measuring instrument is performed (tracking) and, on reaching a predefined position and orientation, the marking of the object point is automatically triggered, that is to say that, when the object point to be achieved is passed over, the point is automatically marked.

Some aspects of the present invention also includes a computer program product or a computer data signal, which is embodied by an electromagnetic wave, with program code, for controlling or carrying out such a method for determining the position of a terrain point with the aid of such a pen-like auxiliary measuring instrument, in particular when the program is executed in a controlling and evaluating unit of a surveying system according to the invention.

A further aspect of the invention relates to a calibrating method for an auxiliary measuring instrument which is designed to form together with a ground-based, in particular stationary, surveying device having range-and-direction measuring functionality, such as for example a total station, a system for surveying and/or staking out object points such as terrain points or surface points of workpieces or interior rooms. The auxiliary measuring instrument has an elongate—but not necessarily straight—main body designed for manual handling, so that an object point, that is to say for example a terrain point or point on an object, can be contacted by a user with a contact end of the auxiliary measuring instrument.

Furthermore, the auxiliary measuring instrument has a body, preferably a sphere, an icosahedron or a dodecahedron, at a further end of the main body, with the body being in a fixed or defined/definable spatial relationship with the contact end. The centre of the body is in this case preferably arranged on the longitudinal axis of the main body, but may alternatively also lie outside the longitudinal axis, which can for example offer advantages with regard to retrofittability or exchangeability of the body.

The body has on its surface at least one optical 2D code, which is designed in such a way that an orientation of the body, and consequently of the auxiliary measuring instrument, can be determined by image processing of a camera image of at least part of the 2D code—that is to say in particular by determining positions in the image of optical features of the body forming the code—on the basis of stored decoding information. Preferably, the 2D code is designed and distributed over the surface of the body in such a way that the orientation of the auxiliary measuring instrument can be bijectively determined on the basis of a segment of the surface of the body, and consequently the 2D code, recorded in a camera image. As a further option, the 2D code is designed in such a way that an orientation and a position, in particular a range, of the body, and based on this the location of the auxiliary measuring instrument, can be completely determined by image evaluation of a camera image of the 2D code and on the basis of the stored decoding information.

For calibrating, the auxiliary measuring instrument is then positioned with the contact end on an object point and pivoted in all spatial directions about the resting, fixed-in-place contact end. As a result, the body performs a movement, which, because of the contact end resting on a fixed point and the fixed distance of the body from the contact end, is subject to such a defined, established constraint. During the pivoting, at least part of the body, and consequently of the 2D code, is optically captured by means of camera images, so that various pivoting locations of the body, that is to say the respective state of movement at different points in time, are captured.

By image-processing evaluation of the imaged 2D code in at least some of the camera images, the respective orientation of the body is ascertained on the basis of this code imaging for at least two different pivoting locations of the body thus captured.

Furthermore, the stored decoding information is calibrated on the basis of at least two vectors from a reference point, for example midpoint, of the body to the contact end, which are determined on the basis of the said constraint from the respective previously ascertained orientation.

Therefore, the auxiliary measuring instrument is manually rotated about the contact end, so that the midpoint of the body moves at least on a kind of circular path; if the movement takes place in a number of pivoting directions or about a number of axes of rotation, this path of the midpoint of the body "expands" to a movement on a (spherical) calotte. To put it another way, in the simplest—but in principle sufficient—case of movement, there is a two-dimensional movement of the body on a circular arc. The contact end or contacted fixed point represents the midpoint of a circular arc (only pitching or rolling) or of a calotte (pitching and rolling), on which the midpoint of the body moves.

The pivoting or rotating may in this case also comprise a turning of the auxiliary measuring instrument about itself (yawing), that is to say for example a rotation about the longitudinal axis of the device passing through the contact end. In this case, an image of the body is taken by a camera at various points on the path of movement formed by the pivoting. For example, in this case four images are produced in each of at least four main quadrants of a calotte spanned by the movement.

These different locations are all related to the same rotation point, at a fixed distance from it (the midpoint of the body therefore moves on one and the same circular arc or one and the same calotte), and therefore consequently the degrees of freedom of movement are restricted in a way that is known in principle. Since the body allows a determination of its alignment, on the basis of this restriction two vectors, associated with such rotating locations, from the body to the contact end are sufficient to calibrate the orientations and/or positions of the body that are ascertained or can be ascertained by means of image evaluation of the 2D code. What is decisive is that, with the 2D code, means by which the alignment of the body can be determined are provided. Since the constraint establishes that the two vectors characterizing the alignment that are used intersect/meet at a defined point (the contact end or fixed point or midpoint of the circle/sphere), deviations of the alignment determined by the 2D code from this actual alignment can consequently be determined.

Optionally, in addition, at least in relation to one of the various pivoting or rotating locations that are used, a range from the auxiliary measuring instrument, in particular directly from the body, that is linked or can be linked with the location of a camera capturing the camera images is measured and used in the calibration. Therefore, the distance from the auxiliary measuring instrument or body in one or more pivoting locations is measured electro-optically by the surveying device, for example a layouter or a total station, for example by means of laser radiation, and this distance thus ascertained is additionally taken into account when calibrating along with the evaluation of the camera images recorded by the surveying device, whereby for example the calibrating accuracy can be increased or fewer rotating locations or code recordings have to be evaluated for the same calibrating accuracy, that is to say fewer images or different locations are necessary for an accuracy that is to be achieved.

Furthermore, the length of the auxiliary measuring instrument is optionally calibrated on the basis of at least some of the camera images recorded during the pivoting movement. The length is in this case preferably defined as the distance from a reference point, in particular the midpoint of the body, to the contact end. The code data linked with the calotte are therefore advantageously additionally used in order to correct or determine the distance from the contact end, and consequently the object point, required for the surveying or staking out.

Preferably, the decoding information comprises rotation matrices in relation to at least two turning angles of the auxiliary measuring instrument, in particular pitching and rolling angles. The rotation matrices are in this case preferably defined by the optical code features and an underlying mathematical model for their decoding.

Optionally, deviations from a desired or ideal position of code markings on the body are determined by the calibration. As an alternative or in addition, a deviation of at least one dimension of the auxiliary measuring instrument, as already mentioned for example its length, from a desired or ideal dimension is compensated.

As a further option, for the calibration, centroids of calottes in relation to the at least two different pivoting locations in the respective camera image are derived, based on a mathematical model, while in the case of the variants described above with opto-electronic measurement of the range from the auxiliary measuring instrument, the respectively measured range is optionally used for deriving the centroids of the sphere.

In some embodiments, the auxiliary measuring instrument has a position and/or orientation sensor, in particular an inertial measuring unit. As part of the calibrating method, a calibration of the position and/or orientation sensor can then take place on the basis of the defined rotating location of the body by using the captured 2D code. That is to say that the data obtained from the camera images, and possibly the measuring-beam-based distance measurement, are used in order to calibrate the sensor data like an IMU integrated in the body.

The invention also relates to a ground-based surveying system for surveying and/or staking out object points, with a, in particular stationary, surveying device having range-and-direction measuring functionality, for example a total station, and an auxiliary measuring instrument as well as a camera, which is for example integrated in the surveying device or else independent.

The auxiliary measuring instrument has an elongate main body, designed for manual handling, so that an object point can be contacted by a user with a contact end of the main body. For example, the auxiliary measuring instrument is designed as a measuring pen that can be used with one hand.

At a further end of the main body, the instrument has a body, with the body being at a fixed distance from the contact end (though this does not have to be a permanent, undetachable fixing, but instead the distance may in principle be variable, for example as a result of a telescopic main body), in particular with the centre of the body arranged on the longitudinal axis of the main body. The body is preferably rotationally symmetrical, in particular spherical or in the form of a dodecahedron or an icosahedron, but bodies that are not rotationally symmetrical are also suitable in principle for the method according to the invention.

As already described above, the body has on its surface an optical 2D code, which is designed in such a way that an orientation, and as an option also a position, of the body, and consequently of the auxiliary measuring instrument, can be determined by image processing of a camera image of the 2D code on the basis of stored decoding information.

Furthermore, the surveying system has calibrating functionality. When performing the calibrating functionality, camera images in which at least two different pivoting locations of the body are captured are recorded by the camera, the locations being provided by pivoting/rotating the auxiliary measuring instrument about the resting contact end, resulting in a movement of the body which, because of the resting contact end and the fixed distance from the contact end, is subject to such a defined constraint.

On the basis of this constraint, at least two vectors, associated with the at least two locations, from a reference point, for example a midpoint, of the body to the contact end are determined on the basis of the respective orientation of the body, the orientation being ascertained on the basis of the imaged 2D code. The calibration therefore makes use of the fact that not only the fixed point (resting contact end) but also, because of the orientation ascertained by the body/2D code, the respective vector from the midpoint of the body to the fixed point is in principle known/defined.

Furthermore, the calibrating functionality provides a calibration of the stored decoding information on the basis of said ascertained vectors.

As a preferred option, in addition, when performing the calibrating functionality, a range from the auxiliary measuring instrument, for example directly from the body or from some other target, which is known to be arranged on the main body of the instrument, is automatically measured by the surveying device by means of measuring radiation, in relation to at least one of the various pivoting locations, and is used in the calibration.

Optionally, the surveying system has automatic state monitoring, which, dependent on the state of the surveying system, suggests a performance of the calibrating functionality to the user. As a further option, as part of the calibrating functionality, any deformation of the auxiliary measuring instrument, in particular its longitudinal axis, is established, preferably quantified and/or compensated.

As a further option, the auxiliary measuring instrument is designed in such a way that its length can be varied. This is made possible for example by the main body having at its one end, defined by the longitudinal axis, a holder for receiving pole-shaped extension pieces and/or by the main body being telescopically designed, so that its length is variable, in particular in steps or steplessly. When performing the calibrating functionality, in such embodiments the current length of the auxiliary measuring instrument can then be verified or ascertained by means of the pivoting movement.

As an alternative or in addition, the surveying device has a drive for automatically changing a target direction and target-tracking functionality, so that, as part of the calibrating functionality, the target direction automatically follows the moving body, which is advantageous especially in the case of auxiliary measuring instruments with a relatively great length, such as for example plumbing poles in the field of geodesy, and consequently a relatively great pivoting range or relatively great radius of the body movement (radius of a circle or sphere).

As a further option, the surveying system is designed in such a way that, as part of the calibrating functionality, an instruction with respect to pivoting the auxiliary measuring instrument for generating the various pivoting locations of the body is displayed to a user on a display, for example a connected field controller or smartphone, such as for example for an optimum, in particular most efficient possible, low-effort arrangement of the locations or for the best possible calibrating accuracy.

As an alternative or in addition, as part of the calibrating functionality, an automatic ending of the capturing of locations of the body takes place as soon as a predefined termination criterion is satisfied. For example, the photographing is ended as soon as a desired calibrating accuracy has been achieved or a defined minimum number of (evaluable) different body locations or feature positions has been determined.

The invention also relates to a computer program product with program code, which is stored on a machine-readable carrier, for performing the calibrating method according to the invention.

BRIEF DESCRIPTION OF THE DRAWINGS

The present invention is described in greater detail below on the basis of the embodiments and application procedures schematically represented in the drawings.

In the Specific Figures:

FIG. 9a-e show further embodiments of a pen-like auxiliary measuring instrument, FIG. 10a,b show an example of a surveying system with a surveying device capable of taking photographs and an auxiliary measuring instrument with spherical coding when pivoting about the probe tip, FIG. 11a,b show examples of pivoting locations of the pivoted code body that are evaluated for the calibration.

DETAILED DESCRIPTION

Figure 1:
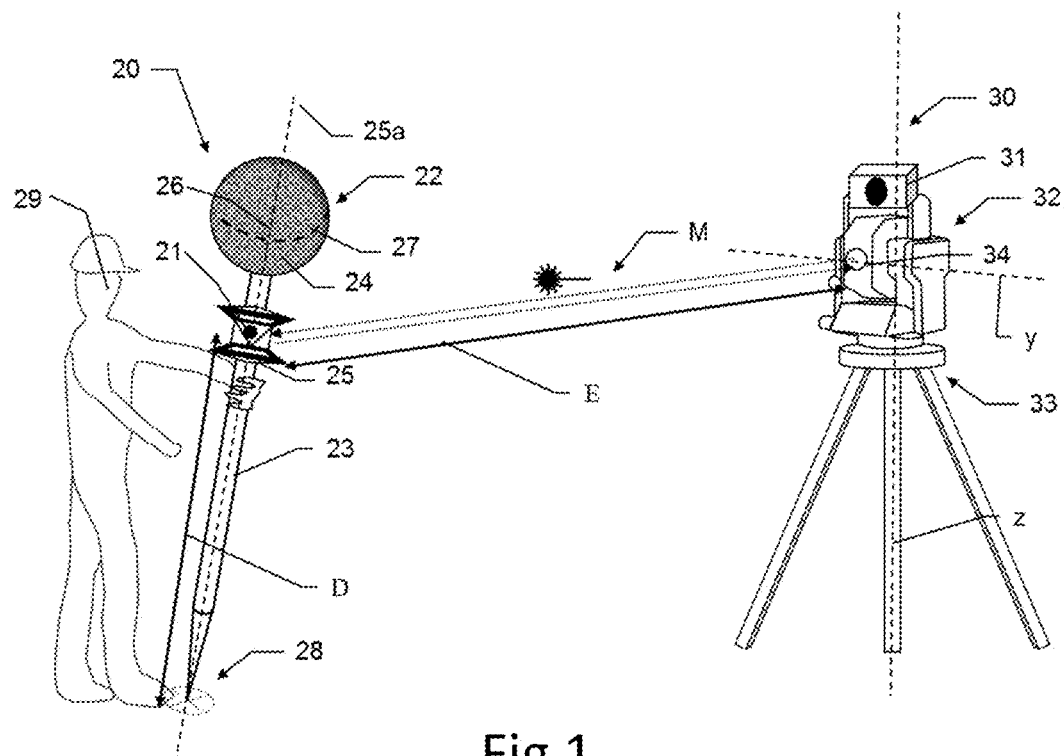
FIG. 1 shows an example of a surveying system with an auxiliary measuring instrument with spherical coding.

FIG. 1 shows purely schematically an example of a surveying system with an auxiliary measuring instrument with spherical coding. The system has an auxiliary measuring instrument 20, which can be carried by a user and is designed as a plumbing pole. The instrument 20 has an elongate body 23 with a longitudinal axis 25a. The plumbing pole 20 or the longitudinal axis can be handily aligned by a user 29 with a terrain point 28 to be surveyed or to be marked out, so that the auxiliary measuring instrument 20 can be used to aim at the terrain point 28. Such a terrain point 28 is in this case located for example outdoors or within a building. The distance D from a reference point 21 of the plumbing pole 20 to the terrain point 28 is in this case already known and stored in a memory of the surveying system. As an alternative to the representation shown, there are also known auxiliary measuring instruments 20 that aim at the terrain point 28 contactlessly, for example by means of a laser distance meter, and measure the then variable distance from the reference point 21 to the terrain point 28 and pass it on to a memory or an evaluation.

The surveying system also has a surveying device 30, for example a total station. The surveying device 30 has a base 33 and an attachment 32, which is arranged on the base 33 pivotably in relation to the latter with reference to a vertical axis z. The mount 33 has a targeting unit 34, which is rotatable with respect to a horizontal axis y. Consequently, the alignment of the aiming unit 34 or the target direction can be varied by rotation about the two axes z and y, wherein the respectively applicable alignment is measured by angle encoders.

The aiming unit 34 includes a light source, for example a laser, which generates measuring radiation which is emitted with the aid of a corresponding optical unit as a measuring beam M, for example as a laser beam, directed onto the auxiliary measuring instrument 20, or to be more precise onto a target 25 of the auxiliary measuring instrument. The target 25 is in this case in a known spatial relationship with the reference point 21, in the example because the center of the target 35 coincides with the reference point 21. On the basis of the measuring radiation, the range E from the total station to the auxiliary measuring instrument 20 or to the reference point 21 is determined, for example with the aid of a transit time of measuring beam pulses and/or by the interferometric principle. Usually, the emitted light is in this case retroreflected by the target 25, so that it can be received by the surveying device 30 and can be detected by means of a detector.

From knowledge of the direction of emission, the range E and the distance D, the position of the terrain point 28 in relation to the surveying device 30 (or to be more precise in relation to a reference point of the surveying device 30) can consequently be determined. If the position of the surveying device 30 with reference to an external coordinate system is known, the position of the terrain point 28 in this coordinate system can consequently also be determined. In the case of a geodetic survey, the coordinate system is for example the UTM coordinate system.

Apart from the variables mentioned, knowledge of the alignment and inclination of the auxiliary measuring instrument 20 (in relation to the surveying device 30 or with reference to the coordinate system) is also necessary however for the injective determination of the position of the terrain point. This can be achieved by the plumbing pole 20 always being positioned perpendicularly on the terrain point 28, so that the orientation is already known. This predetermined attitude of the auxiliary measuring instrument 20 is not always possible, however, for example when corners of a building are used as the terrain point 28, or at least can scarcely be maintained exactly by the user 29, especially— but not only—when a contactlessly operating auxiliary measuring instrument 20 is concerned.

For this reason, the auxiliary measuring instrument 20 has an attachment 22, with the aid of which the orientation of the auxiliary measuring instrument 20, i.e. inclination, roll and yaw or azimuth angle, can be determined. The attachment 22 has the form of a sphere, which is arranged on the body 23 in a known spatial reference relationship with the longitudinal axis 25a, in the example in that the center 26 of the sphere lies on the longitudinal axis 25a, whereby the longitudinal axis 25a can be regarded as a North-South axis of the sphere, and consequently an equator 27 of the sphere is predefined.

An optical, two-dimensional code 24 is arranged in a distributed manner on the surface of the sphere. An image of the sphere 22 or the code on its surface is recorded by means of a camera 31, arranged in a defined manner, of the surveying device 30 (as an alternative to the representation shown in FIG. 1, the camera 31 may for example also be designed as an on-axis camera, that is to say without any offset in relation to the optical axis of the aiming unit 34). The code 24 is designed in such a way that, by means of image evaluation of the camera image, the orientation of the sphere 22, and consequently of the surveying pole 20 in relation to the camera 31 and consequently in relation to the surveying device 30, can be bijectively ascertained. That is to say that the inclination of the longitudinal axis 25a and its alignment (rotating position of the auxiliary measuring instrument 20 about the longitudinal axis 25a) are bijectively determined on the basis of a code (segment) visible from the surveying device 30 by means of image evaluation/processing.

The code 24 runs around the surface, at least in a plane running perpendicularly to the longitudinal axis 25a and through the sphere center point 26, so that code 24 can be seen, and consequently the orientation can be bijectively determined, from any side view. In the example, the code 24 is even formed in a distributed manner over the entire surface of the sphere and in such a way that, in any location (apart for example from instances where it is covered by the main body) of the auxiliary measuring instrument 20, this location can be determined. As an alternative, for example, an upper region and a lower region of the sphere are code-free or the sphere 22 is cut off at the top and bottom (i.e. the two "polar caps" of the sphere 22 are not printed with code or are not present at all), on the assumption that extreme inclinations of the auxiliary measuring instrument 20 or the longitudinal axis 25a, for example by more than 60° with respect to the vertical z, on the assumption that do not occur in the application intended for the auxiliary measuring instrument 20 or surveying system concerned, and therefore do not have to be determinable.

As an option (that is not represented), the pole 20 additionally has a light for illuminating the attachment 22, so that the attachment 22, or to be more precise the code 24, can be seen sufficiently well in the camera image even in poor outside light conditions. For this, the sphere 22 is designed for example as a translucent hollow body, in the interior of which there is a light source, so that the surface of the sphere is illuminated from the inside.

As a further option, the sphere attachment 22 additionally serves as a protective body for absorbing impact on the auxiliary measuring instrument 20. For this purpose, the sphere 22 is positioned, for example as shown in FIG. 1, at the upper end of the pole 20 and is of such a large diameter that, if the plumbing pole 20 falls over from the upright position, the pole 20 hits the ground with the sphere 22, which is for example produced from an elastic or otherwise unbreakable material or at least has a protective layer of such material. The remaining parts of the auxiliary measuring instrument 20 are consequently protected by the sphere 22 from such mechanical damage.

As an additional option, the target 25 is integrated in the attachment 22. For example, retroreflective elements (for example in the form of a retroreflective film or layer or individual retroreflectors that are distributed segmentally in a way similar to in the case of a soccer ball), which perform the function of the retroreflector 25, are distributed over the surface of the sphere. As a further alternative, direction and range determination are performed for example in an image-based manner, in that the sphere attachment 22 or the code 24 serves not only for orientation determination, but also for position determination, and consequently as a target 25. For this purpose, the range is ascertained, for example on the basis of the size of the sphere 22 and/or of the code in the image in comparison with the known actual size, and the direction is ascertained on the basis of the position of the sphere 22 and/or of the code in the image. The code is either the same code that also codes the orientation, that is to say therefore performs a dual function, or an additional code serving purely for position coding.

FIGS. 2a-2d shows an example of an image evaluating operation of a camera image 35, which has been recorded by the camera of the surveying device. Depicted in the image 35 is part of the auxiliary measuring instrument, including the sphere attachment 22 (see FIG. 2a).

Figure 2A:
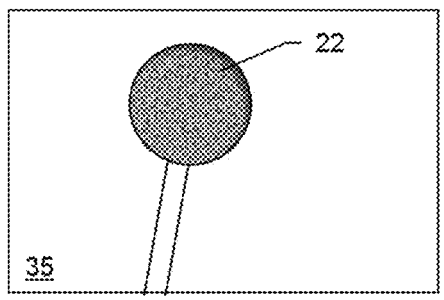
FIG. 2a-d show an example of an image evaluating operation with respect to decoding.
Figure 2B:
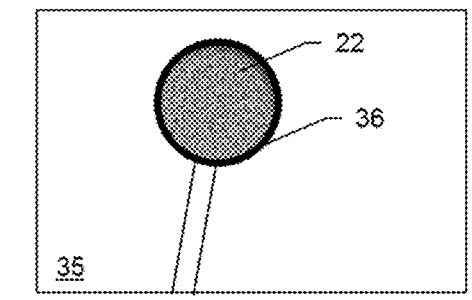

Thus, in the image a circle geometry 36 is adapted ("fitted") as well as possible to the depicted circular form of the sphere 22 by means of an algorithm known per se, as indicated in FIG. 2b.

Figure 2C:
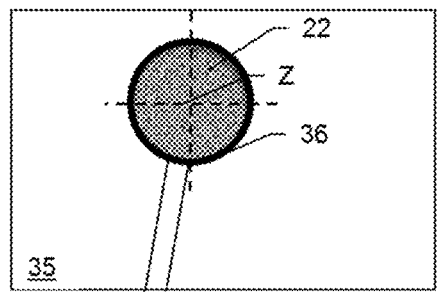

In FIG. 2c it is shown how the center Z of the depicted attached sphere 22 is determined on the basis of the known center point of the circle geometry 36.

A region or segment 37 of the image 35 or of the depicted surface of the sphere 22 that is situated at the center Z or represents a central segment of the imaging depicting the surface of the sphere (see FIG. 2d) is then used for the actual code evaluation or decoding.

In other words, in the image the silhouette of the sphere in the image is determined and at its centroid a region of interest (RoI) is ascertained and used for the decoding, and consequently orientation determination. Concentration on or restriction to a segment 37 of the code arranged at the center Z of the depicted image has the advantage that the influence of distortions of the three-dimensional surface of the sphere in the two-dimensional camera image 35 is consequently kept as small as possible, in particular to the extent that it is negligible and does not have to be taken into account in the decoding. That is to say that the segment 37 is chosen such that on the one hand sufficient code for the bijective determination of the location of the sphere in relation to the camera or the total station is visible/available in the segment 37, on the other hand the image evaluation does not have to differ from an evaluation of a code that is arranged on a plane which is located perpendicularly to the recording direction or parallel to the image plane.

As an option, a determination of the location of the center Z in the image or the deviation of the location from a desired position is performed, for example from the center of the image. On the basis of this offset, the target direction of the surveying device is then tracked, so that the center Z comes to the desired position. This allows an exact alignment of the target direction or, in the case of a moving auxiliary measuring instrument, tracking of the target.

Figure 2D:
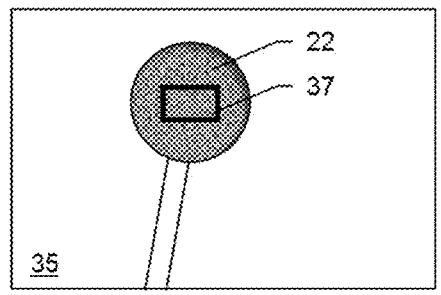
Figure 3:
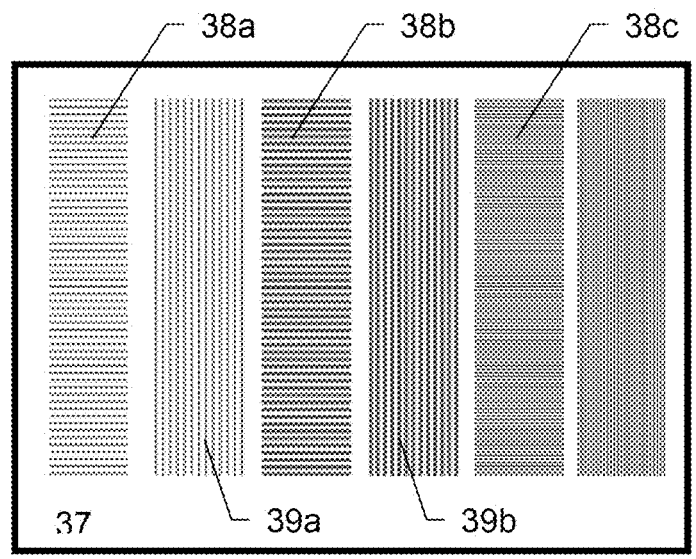
FIG. 3 shows an example of an embodiment of a coding, FIG. 4a,b show an example of a surveying system with calotte measuring functionality, FIG. 5a,b show examples of methods for position determination by means of producing a calotte.

FIG. 3 shows purely schematically an example of a code on the basis of which the orientation of the sphere attachment, and consequently the auxiliary measuring instrument, can be bijectively determined in a segment 37 (cf. FIG. 2*d*). In the example, the code is of two parts, in such a way that it has first code elements 38*a*-38*c*, which serve for the bijective coding of a first direction, for example the length (with respect to the equator 27 from FIG. 1). Furthermore, there are second code elements 39*a*-39*c*, which bijectively code the width as a second direction. By decoding the two code parts 38, 39, it is consequently specified bijectively which "location" on the sphere can be seen in the segment 37, and consequently the orientation of the sphere in relation to the image (segment).

In the example, the code is in this case of such a form that in principle already a respective element 38*a*, 38*b* or 38*c* or 39*a*, 39*b*, 39*c* alone bijectively codes the length or width. The presence of in each case three code elements 38*a*-*c*, 39*a*-*c* that is shown serves for providing various resolution stages, so that similar resolutions can be ascertained from different ranges between the camera and the sphere, and consequently there is the same accuracy of the orientation determination over all measuring ranges. For example, a respective element 38*a* and 39*a* with a comparatively coarse structure serves for great ranges, a respective element 38*b* and 39*b* with medium resolution serves for medium ranges and a respective element 38*c* and 39*c* with a fine structure serves for small ranges or measurements in the near range. Consequently, such a code is also suitable for use with surveying devices with zoom-free cameras.

As an alternative or in addition, such a code division with finer and coarser code elements serves for increasing the robustness of the measurement by providing redundancy and/or providing coarse (medium) and fine resolution. For example, in a first step a coarse, bijective length is determined on the basis of the code strip 38*a* and in a second step is refined by the code strip 38*b* and/or 38*c*, for which the code strips 38*b* and/or 38*c* do not have to code bijectively.

The code elements 38, 39 for the coding of two different directions may differ by different geometries, as indicated in the example. As an alternative or in addition, they differ by different colors, for example in that the length coding 38 is in green and the width coding 39 is in red. Such different colors (as a difference from the representation shown) also facilitate for example a superposed arrangement of code elements, so that the limited space of the surface of the sphere can be covered more densely.

Figure 4A:
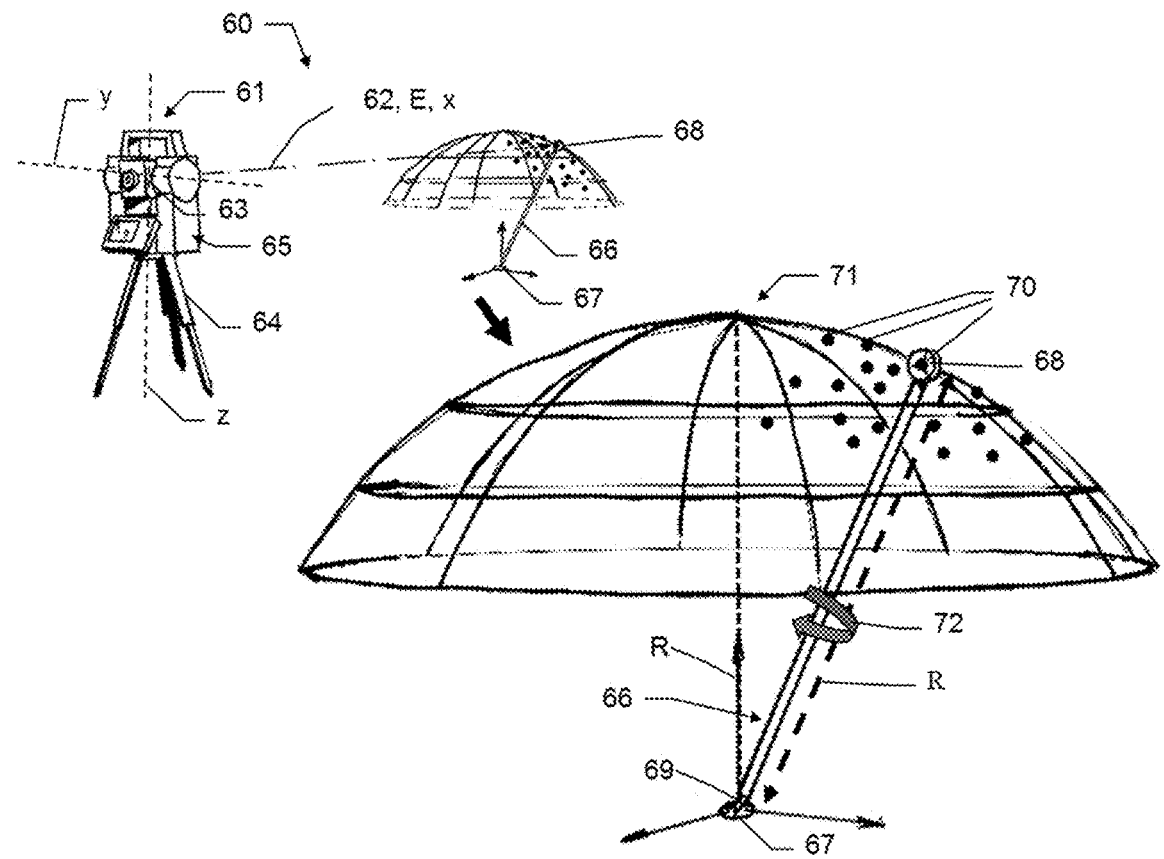

FIG. 4*a* schematically shows an example of a surveying system 60, which has a calotte measuring functionality. The surveying system 60 has a surveying device 61, designed for example a total station, and an auxiliary measuring instrument 66, which can be optically aimed at by the surveying device 60 and is designed for example as a plumbing pole with a retroreflector. The surveying device 61 has a base 64 and also an upper part 65, which is arranged on the base 64 and is rotatable in relation to the base 64 about an axis z. The upper part 65 in turn has a defined tilting axis y, about which a targeting unit 63 can be pivoted. The targeting unit 63 is for example designed as a telescopic sight. The targeting device 63 defines a target direction x, which can be varied by pivoting about the two axes z, y. For determining the respectively applicable target direction y, the surveying device has at least one angle meter, for example to establish the rotational position about the axes y and z.

The auxiliary measuring instrument 66 of the surveying system 60 has a target 68, which can be aimed at by the surveying device 61 by means of the targeting device 63, and moreover a range E (in target direction x) can be measured by means of a range meter of the surveying device 61. In the example, for this purpose a measuring beam 62 is emitted by the surveying device 61 in target direction x, retroreflected by the target 68, the beamed-back measuring beam 62 is detected by the surveying device 61 and the range E is determined, for example by means of the Fizeau principle, transit-time measurement or interferometrically. Known from the prior art are for example alternative image-based target-position determining methods, in which the target 68 has specific features, with the aid of which the range and orientation of the target 68 can be measured on the basis of an image of the target 68 that is recorded by a camera of the surveying device 61 (i.e. the camera together with a corresponding image-evaluating algorithm forms the range meter). Further alternatives are for example stereometry or range images. Knowledge of the range E and the target direction x can consequently be used in any event for determining the position of the target 68 in relation to the surveying device 61 and, with a known absolute position of the surveying device 61, also the absolute position of the target 68.

The target position in turn serves for determining the position of a terrain point 67, which is to be surveyed for example in the course of geodetic surveys or in the course of construction activities. To be able to obtain an injective inference of the position of the terrain point 67 from the target position, the target 68 must be in an injective relative position in relation to the terrain point 67.

This is achieved in surveying systems 60 or surveying methods known from the prior art by the target 68 attached to the auxiliary measuring instrument 66 being at the defined, known distance from the end of the auxiliary measuring instrument 66 that contacts the terrain point 67, and consequently also at a known distance from the terrain point 67. Furthermore, the auxiliary measuring instrument 66 is set up perpendicularly on the terrain point 67, so that the target 68 is perpendicularly above the terrain point 67. As a result, the target position and the terrain point position are injectively linked. A disadvantage of this method is that a perpendicular alignment cannot be easily maintained and is even not always possible, for example because the terrain point 67 is an inner or outer corner of a building.

According to the invention, this disadvantage is overcome by the surveying system 60 having a callotte measuring functionality, as explained in greater detail below on the basis of the lower part of FIG. 4*a*. The auxiliary measuring instrument 66 is positioned with its contact end 69 on the terrain point 67. Without breaking the contact, i.e. the contact end 69 remains fixed on the terrain point 67, the auxiliary measuring instrument 66, and consequently the target 68 attached to its other end, is thus pivoted. The target 68 thereby assumes different target positions 70, which on account of the rigid connection to the terrain point 67, are all linked with the terrain point 67.

Figure 4B:
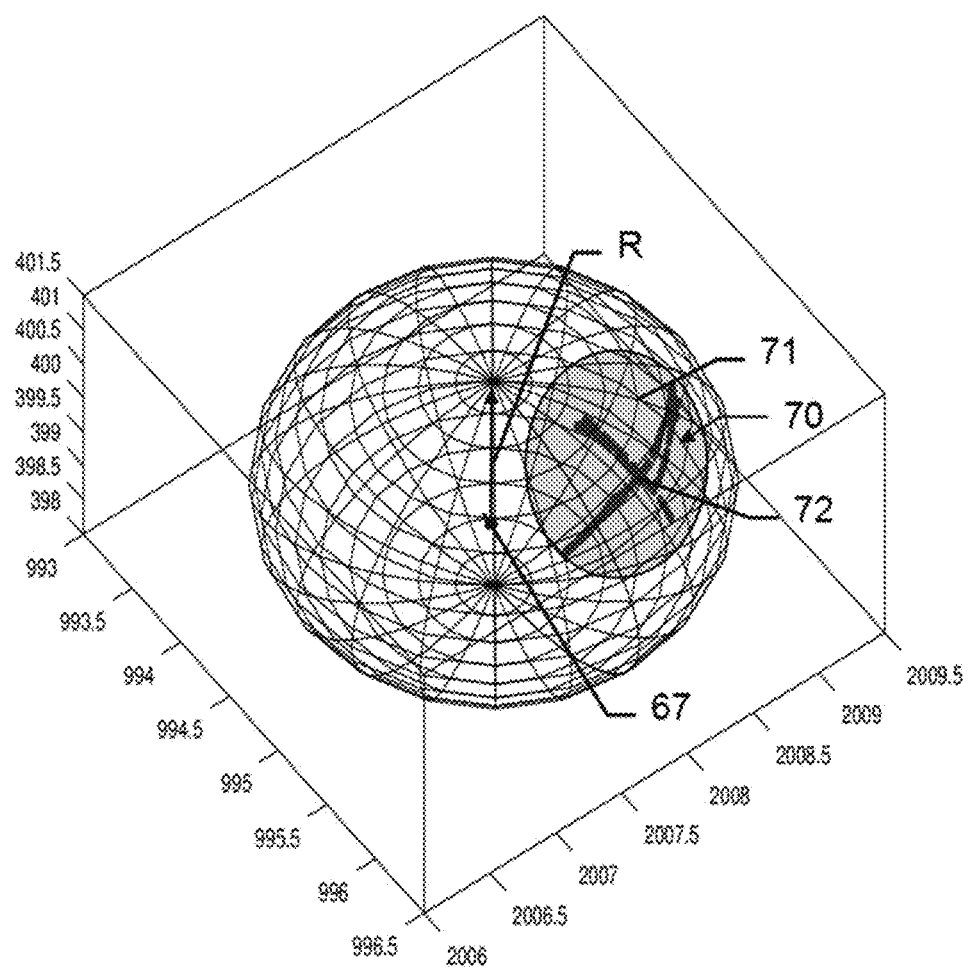

As illustrated in FIG. 4a and also in FIG. 4b, the pivoting movement 72 with the fixed distance R between the target 68 and the point 67, allows the target 68 to assume different target positions 70, which are not coplanar to one another and are all located on a surface of a sphere or segment of a surface of a sphere or calotte 71, the center point of which is the sought terrain point 67. Consequently, the sought position of the terrain point 67 can be determined from knowledge of the calotte 71.

For this purpose, either at least four or at least three of the different target positions 70 are determined by means of the surveying device 61 and used as a basis for calculating the calotte 71, for example by means of a best-fit algorithm for minimizing the squares of the distances of the target positions 70 in relation to the surface of the sphere. Generating the target positions 70 either takes place manually or automatically in the sense that an optionally present automatic target tracking, known in principle, of the surveying device 61 is used as part of the calotte measuring functionality, in order to change the target direction x automatically so as to follow the pivoting of the target 68 and thereby to continuously determine target positions or calotte points 70. The continuous determination of target positions is in this case performed for example at a previously predefined measuring rate, for example every tenth of a second, half a second or every second, or—possibly dynamically—adapted to a speed of the pivoting movement, measured for example on the basis of at least two measured target positions and their difference in time.

Three target positions 70 are in principle already sufficient for calculating the calotte 71 if the distance R from the target 68 to the terrain point 67, that is to say the sphere radius R, is known, that is to say this distance or the height of the plumbing pole 66 is stored for example in a memory of an evaluating unit of the surveying system. On the basis of four instead of only three target positions 70, the calotte or the sphere center point 67 can be injectively calculated even without knowledge of the distance or sphere radius R. A stored distance R is in such a case optionally used for increasing the robustness of the position determination or for verification, for example in that a sphere radius R ascertained on the basis of the at least four target positions 70 is compared with the stored distance in order to determine the extent of any deviations.

As a further option, such an extent of the deviation is in this case used as a measure for assessing the quality of the calotte or position calculation. The smaller the deviation, the better the quality. As an alternative or in addition, another type of overdetermination of the calotte is used to provide a measure of quality. If there are more than the three or four minimum target positions 70 with which the calotte 71 or the center point 67 has been calculated, the accuracy or quality of the calculated calotte 71 is ascertained on the basis of the "excess" target positions.

The assessment of the quality for example on the basis of a measure of quality is in this case performed automatically and/or by a user, as further explained on the basis of the following figures.

Figure 5A:
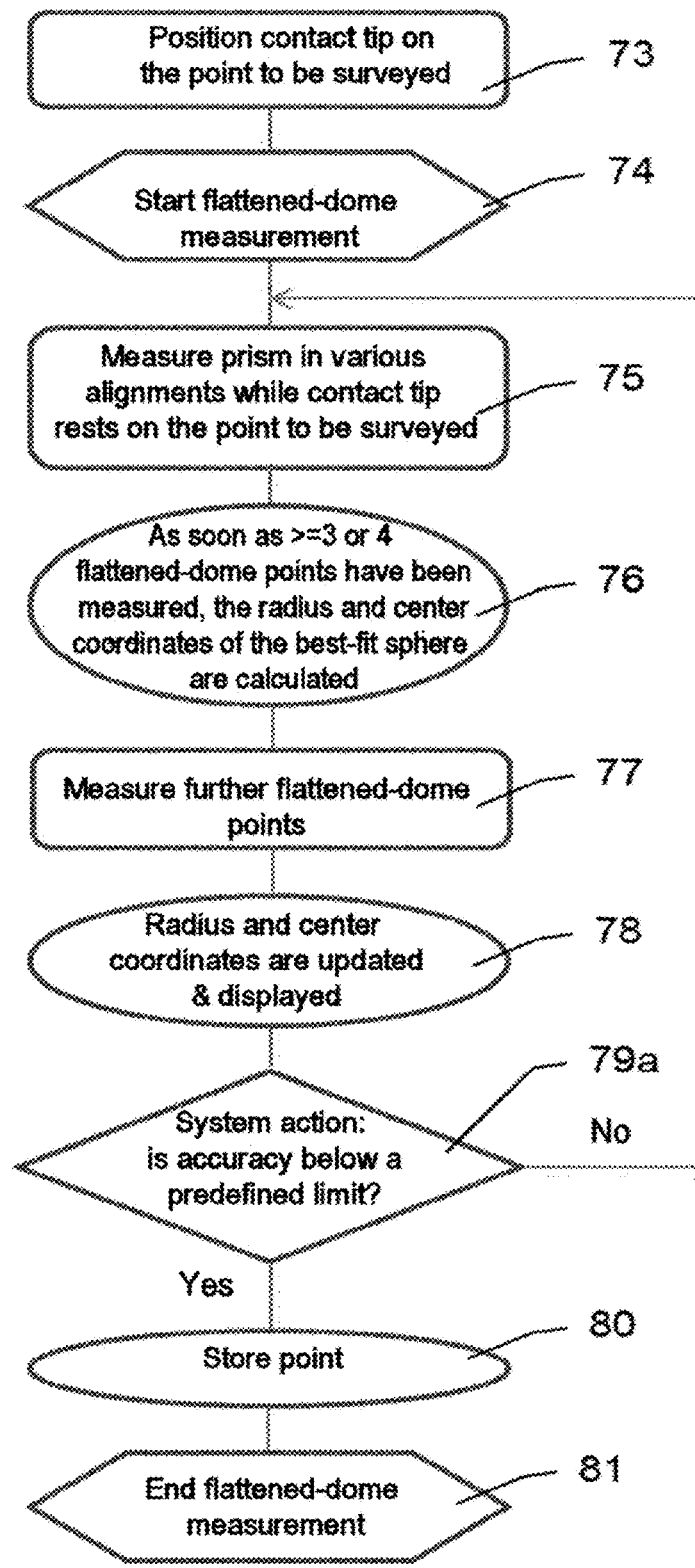

FIG. 5a shows a first example of a method for position determination by means of producing a calotte. In step 73, the contact end of the auxiliary measuring instrument is brought into physical contact with the terrain point. Subsequently, in step 74, the calotte measuring functionality is started. The auxiliary measuring instrument is pivoted about the terrain point and the target is thereby brought into various target positions, which are all at the same distance from the terrain point, and these target positions (calotte points) are determined with the aid of the surveying device (step 75).

As soon as at least four (or, when using the defined target height or pole length, at least three) calotte points have been produced, the radius and center point are calculated by the best-fit method (step 76) and further calotte points are generated by further movement of the target and further target position determination (step 77). On the basis of these further target positions, the radius and sphere center point are updated or refined and in the example are displayed on a display of the surveying system, for example in the form of a graphic (step 78). Consequently, in this variant the determination of target positions and calculation of the calotte take place simultaneously: as soon as the minimum number of for example four target positions are obtained, a calotte is calculated and this is continuously newly calculated or refined on the basis of the continuously supplied target positions. Optionally, the provisional calotte or the provisional sphere data is or are displayed, for example graphically, by a user display of the system, so that already during the calotte measuring operation the user obtains information concerning the measurement result and if applicable can assess this information and for example influence, adapt or terminate the measuring operation.

The surveying system then assesses in step 79a the accuracy or quality of the calculated calotte, for example on the basis of a measure of quality as mentioned above. If the accuracy is below a predetermined limit, that is to say there is sufficient quality, in step 80 the coordinates of the sphere center point or terrain point are permanently stored and the calotte measurement is ended (step 81). Otherwise, the generation of target positions is continued. The calotte points or target positions that served for the calculation of the calottes, and consequently the terrain point position, are for example only kept in a temporary store for the method, and are not permanently stored but erased after final determination of the terrain point.

Figure 5B:
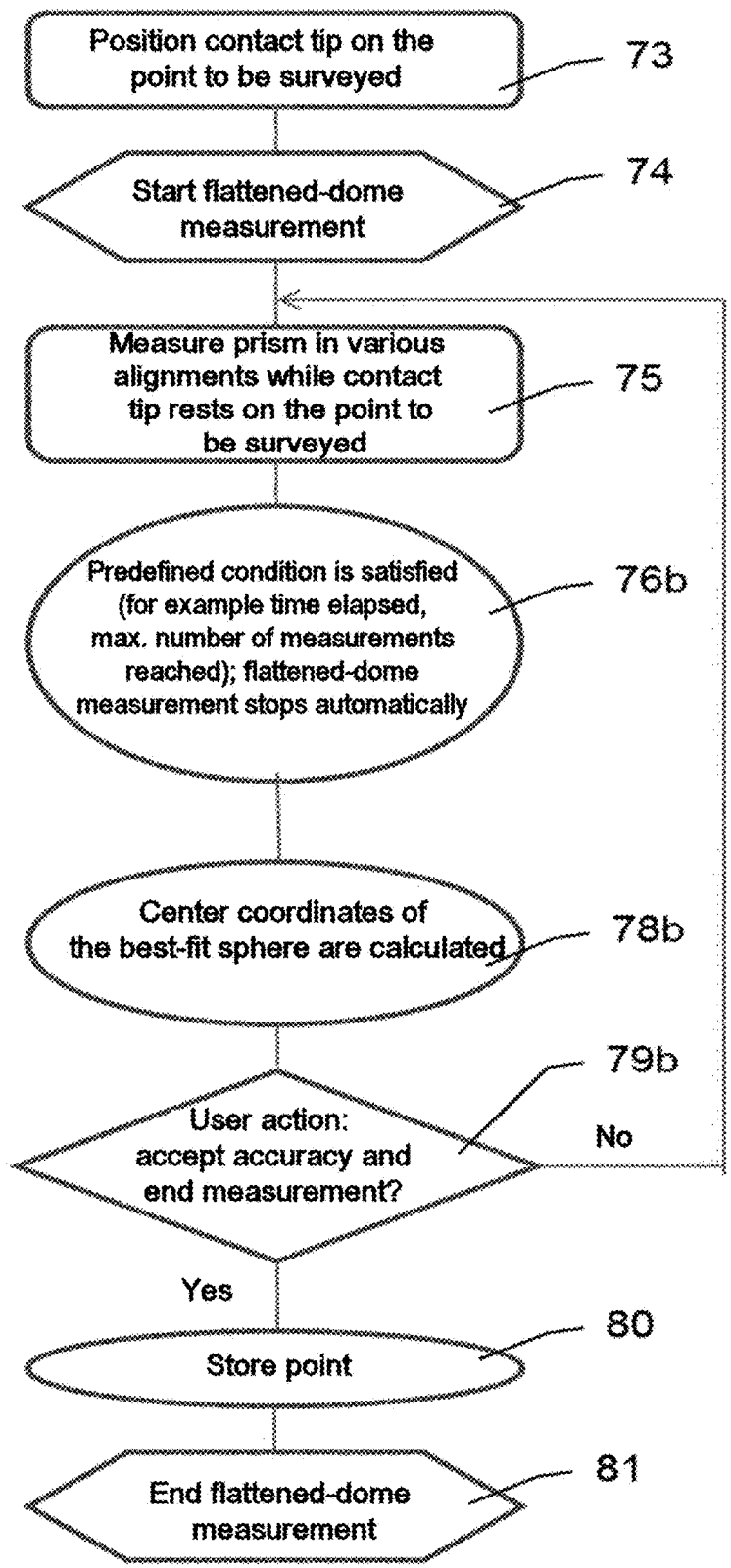

FIG. 5b represents a variation of the method according to FIG. 5a. As a difference from the foregoing, a check of the calotte or of the sphere center point, and if applicable the sphere radius, is performed by the user in a step 79b and it is decided by the user whether the terrain point position is exact or sharp enough or whether a further or renewed target position determination is performed in order to improve or newly calculate the sphere center point.

As a further difference from FIG. 5a, a calculation of the calotte or the sphere center point is only performed in a step 78b after the determination of target positions in a step 76b has been completed. As a criterion that serves for deciding on the ending of the target position determination, for example a time period and/or number of measured values is used. For example, it is stipulated that a set minimum measuring quality is to be achieved or a minimum number of ten target positions are to be determined or the measurement is ended after two minutes. Then, the calotte is calculated on the basis of these ten positions or the positions ascertained within the two minutes.

Figure 6:
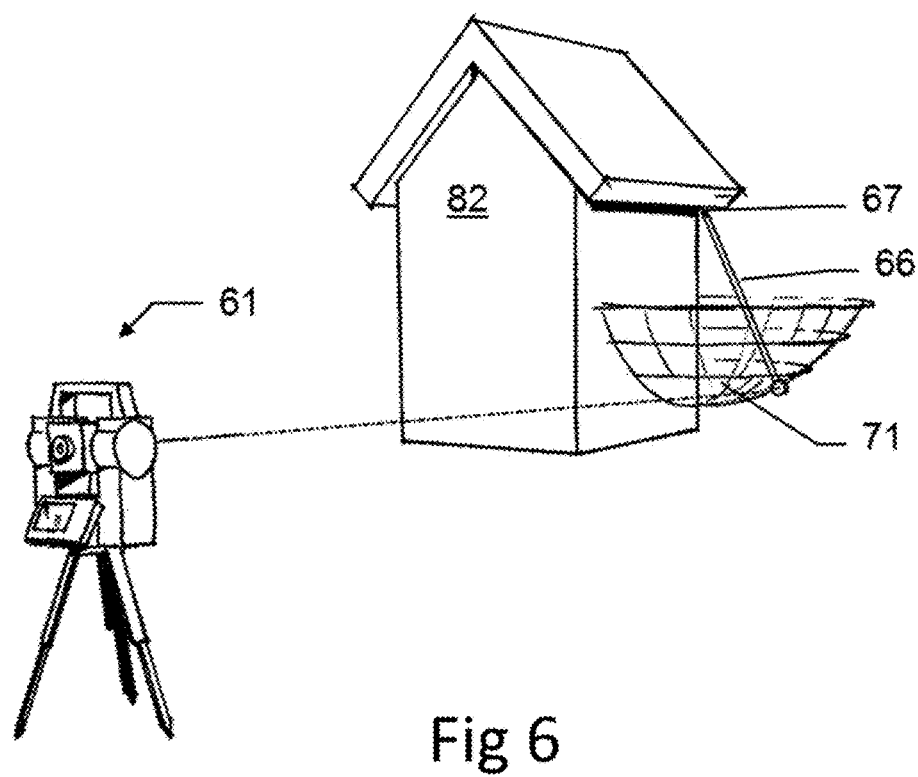
FIG. 6 shows an example of surveying with the aid of a calotte measuring functionality.

FIG. 6 shows an example of how a terrain point 67 that cannot be surveyed with conventional surveying systems, or only very laboriously, can be advantageously surveyed by means of the calotte measuring functionality. In the example, the terrain point 67 is a location of a building 82 at the interface of the roof and wall. It is not possible there for the surveying pole 66 to be set up perpendicularly, but contacting with its contact end and rotating movement with the point on the building as a fixed point as shown. Consequently, the three or four target positions necessary for the calculation of a calotte 71 can be generated, on the basis of which the sphere center point is calculated, whereby the sought position of the terrain point 67 is determined.

Figure 7A:
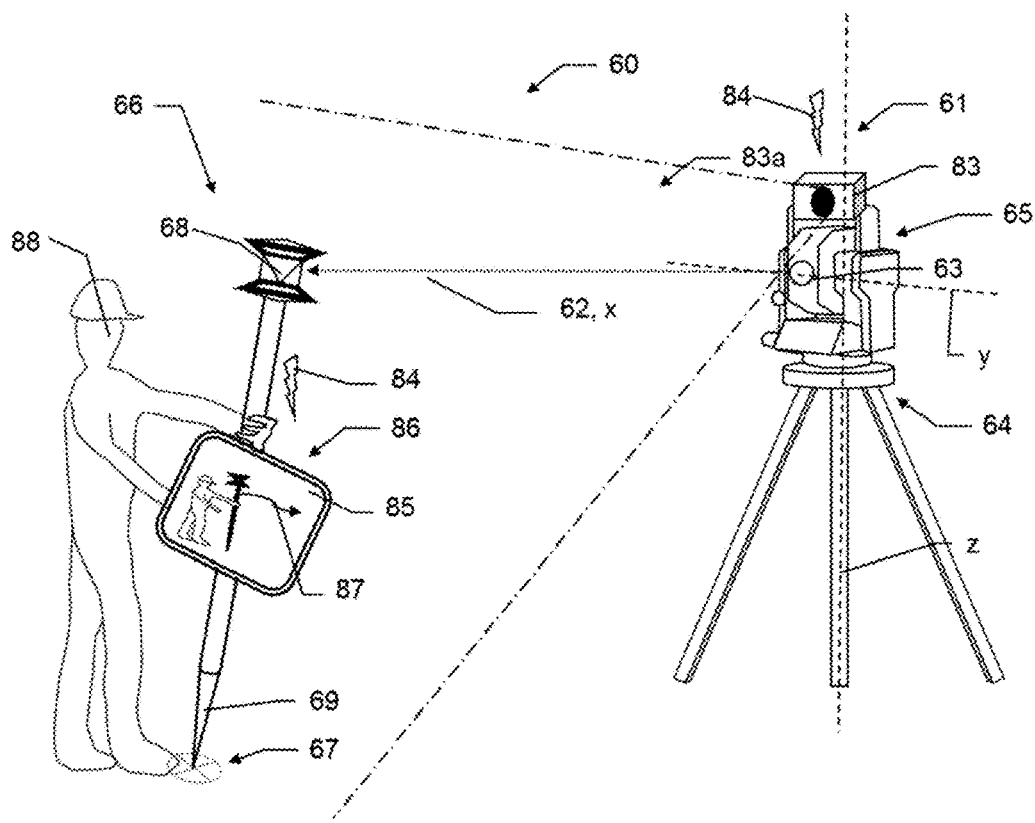
FIG. 7a-c show a development of the surveying system with calotte measuring functionality, FIG. 8a,b show a first example of an embodiment and application of a pen-like auxiliary measuring instrument.
Figure 7B:
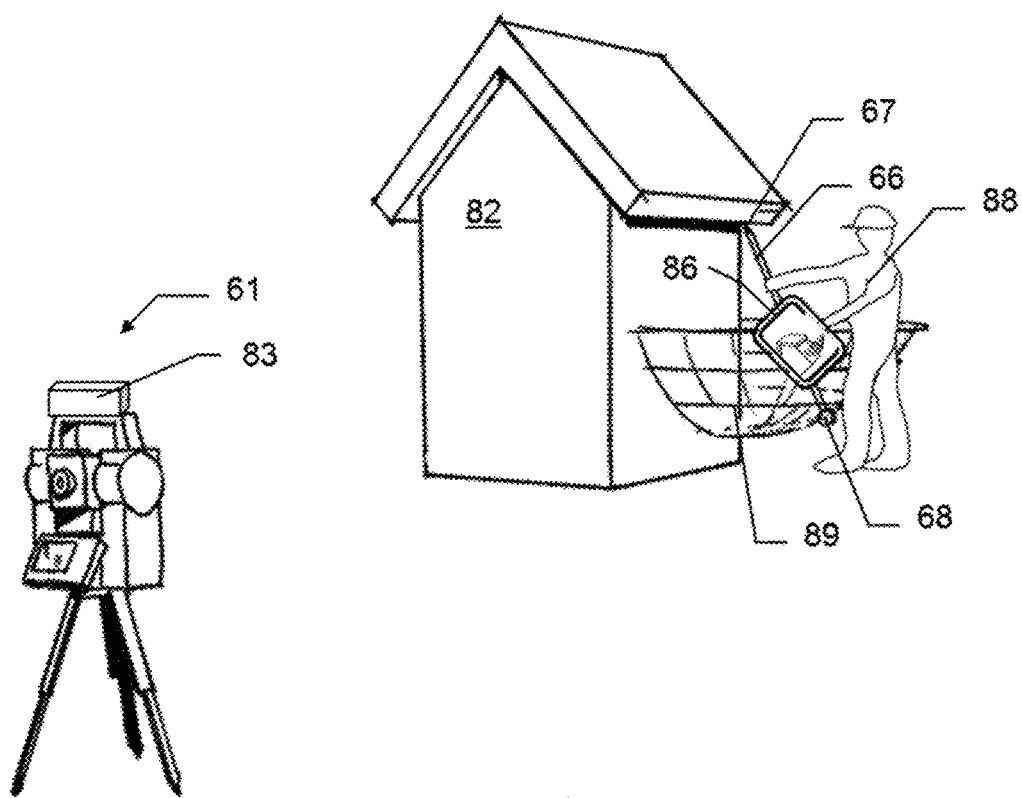
Figure 7C:
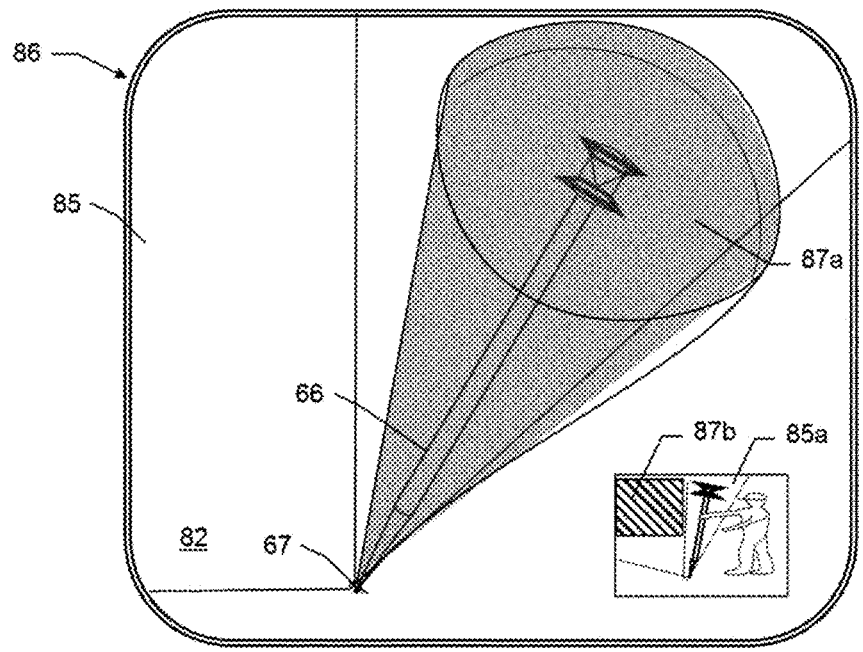

FIGS. 7a-c illustrate a development of the surveying system 60. In the example, a controller of the system 60 is designed in such a way that an instruction, for example a graphic instruction as shown, for the pivoting of the auxiliary measuring pole 66 to be performed by the user 88 is displayed to the user on a display 86 of the auxiliary measuring instrument 66 (see FIG. 7a). That is to say that the system 60 prompts the user 88 with respect to providing the positions of the target 68. The prompting or instructing takes place in this case for example by an optimum arrangement or distribution of the target positions for the calculation of the calotte being achieved. For example, the user 88 is instructed to pivot the auxiliary measuring instrument 66 in such a way that a distribution of the target positions that is as homogeneous or uniform as possible, or is over as large an area as possible, is achieved.

In the example, for providing graphic user prompting by means of a total station camera 83, which has a field of view 83a, which is at least coarsely aligned in the aiming direction x, an image 85 of the auxiliary measuring instrument 66 set up on the terrain point 67 together with the user 88 and a segment of the (measuring) surrounding area is recorded. On the basis of this image 85 recorded by the surveying device 61, individual target positions to be attained or a target position area are automatically or manually predefined. These are graphically marked in the image or a pivoting movement that leads to the target positions to be provided (arrow 87) is graphically marked in the image 85. The instruction image 85 thus prepared is then transmitted wirelessly (indicated by the symbols 84) to the display 86 of the marking pole 66 and displayed there to the user 88 on the display 86.

Since the camera image 85 is advantageously recorded from the viewpoint of the surveying device 61, the target positions suitable for an optimum calculation of a calotte can be estimated particularly well in it. Thus, instead of a generalized instruction, an instruction deliberately adapted to the specifically applicable measuring situation and spatial/locational circumstances can be produced and made available to the user 88.

Such an ascertainment of a suitable target position area 89 is schematically shown in FIG. 7b. The surveying device 61 records from its location, with its camera 83, an image of the measuring location around the terrain point 67, which includes at least the corresponding part of the building 82 and the user 88 together with the applied auxiliary measuring instrument 66. On the basis of this camera recording, the controller of the surveying system ascertains an area 89 within which the user 88 is to pivot the target 68. Areas that cannot be seen or aimed at by the surveying device 61, for example on account of being covered by the building 82, are thus deliberately excluded. An advantage of the surveying device perspective as a basis for the instruction of the user 88 is that from there it can be estimated with certainty which spatial areas or positions of the auxiliary measuring instrument are suitable for the calotte measurement and which are not.

FIG. 7c shows an example of the graphic instructional representation on a user display 86. In an image 85, the perspective of the user of the measuring surrounding area with the terrain point 67, the corner of the building 82 and the measuring pole 66 is artificially replicated on the basis of an image of the surveying camera. In this image 85, an area 87a within which the user is intended to pivot the auxiliary measuring instrument 66 is also indicated. As an option that is not shown, it is in this case indicated in a continually updated manner which parts of the area 87a the user has already covered, so that the user is kept informed the whole time which segment of the area 87a has not yet been covered. As a further option, as shown, apart from the image 85 imitating the viewpoint of the user, a further image 85a is displayed (as an image in the image), reproducing for example the viewpoint of the surveying device or its camera. Also this image optionally has user-prompting information, for example as shown the indication of an area 87b that is unsuitable for target position determination, for example because of a visual obstacle, and into which the user therefore should not move the target.

As an alternative or in addition to a camera-image-based instruction, the instruction is based on the first already measured target position or positions. That is to say that at least one target position is determined and on this basis it is for example calculated by the system controller which further target positions are to be assumed. As a further option, the display 86 is used to output a warning to the user 88 if target positions provided by the user cannot be determined, or only insufficiently, or are not suited or only poorly suited for the calotte calculation. Such an optical or else acoustic warning allows the user 88 to correct the pivoting.

Figure 8A:
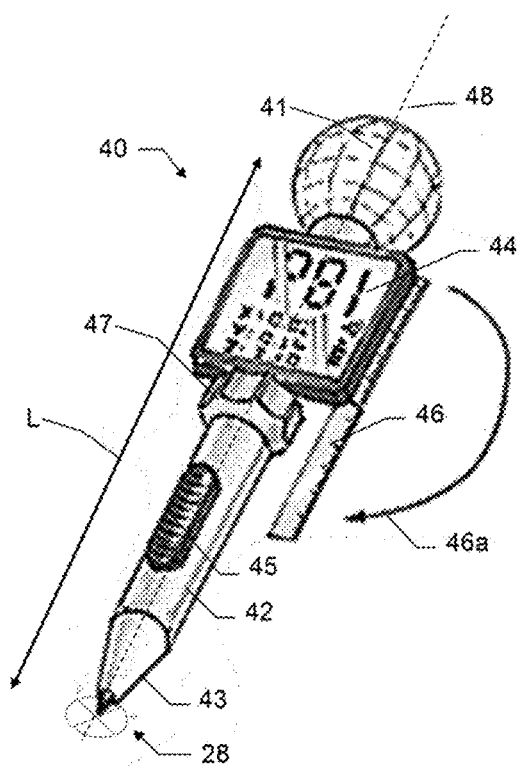
FIG. 8c shows in cross section a further exemplary embodiment of a measuring pen.
FIG. 8d shows an embodiment of a pen with a probe ball.

FIG. 8a shows a first exemplary embodiment of a pen-like auxiliary measuring instrument 40. The auxiliary measuring instrument 40 resembles in size and shape a pen; it has an elongate main body 42, the one end of which is designed as a tip 43. This tip 43 is intended for designating a point 28, which is to be measured or marked out with the aid of the auxiliary measuring instrument 40. The end 43 is configured in the example as a contact tip, with which a respective point 28 is designated by being touched. As an alternative, such a point 28 is designated contactlessly, for example in that at the end 43 there emerges the visible light of a laser distance meter, with which the point 28 can be marked in a punctiform manner and measures the distance between the auxiliary measuring instrument 40 or an auxiliary-measuring-instrument reference point and the point 28. As a further option, the contact for designating the point 28 is not arranged on the longitudinal axis 48, but at a distance from it at a defined angle, for example at right angles, so that the tip or the end 43 is L-shaped. Such a configuration may be advantageous in the case of certain surveying tasks, for example to contact and survey a point on the inner periphery of a pipe, conduit or hole.

In the case depicted, the distance between the reference point and the point 28 to be surveyed or marked out is already known on account of the fixed length L of the main body 42 or the auxiliary measuring instrument 40 and does not have to be separately measured for the determination of the position of the point 28. The position and orientation of the auxiliary measuring instrument 40 are in any case measured during the designation of the point 28 by a surveying device stationed at a distance, so that the absolute position of the point 28 can be ascertained on the basis of a known, absolute position of the surveying device, the position and orientation of the auxiliary measuring instrument 40 and the length L or the distance between the auxiliary measuring instrument 40 and the point 28.

In the example, as a measuring aid for determining the position and orientation of the auxiliary measuring instrument 40, there is a sphere attachment 41 at the "upper" end of the measuring pen 40. This sphere attachment 41 has on its surface a code which can be evaluated in a camera image (recorded by the surveying device) in such a way that the orientation of the sphere 41 in relation to the image or the camera (or the surveying device) can be determined. On the basis of the depicted size of the sphere 41 and/or the code and/or a further code, the range between the camera and the sphere 41 is also determined, from which, together with a measured or known recording direction (and if applicable position of the sphere or of the center of the sphere in the image), the position of the sphere can be determined (also see the description of FIG. 1).

The auxiliary measuring instrument 40 therefore has at least one body by means of which the orientation and/or position of the auxiliary measuring instrument 40 can be determined in interaction with an external surveying device, with which the auxiliary measuring instrument 40 forms a surveying system. Optionally, the pen 40 has a supporting inertial measuring unit (IMU), in order to make the location determination more robust or to bridge dead angles, in which location determination is not possible on the basis of the sphere 41 because the line of sight is interrupted. Also, such an IMU can be used in combination with position tracking on the basis of the position-indicating body 41, i.e. when there is a position-changing movement of the pen 40, a comparison of the IMU data with the position data that are obtained by the surveying device on the basis of the body 41 is performed.

As an alternative to the sphere body 41 that is shown, which allows both position determination and orientation determination, an auxiliary measuring pen 40 according to the invention has a body which allows the position determination with the surveying device, and the orientation is determined by means of internal sensors in the pen.

The auxiliary measuring pen 40 additionally has a man-machine interface, which in the example has a display 44, a scroll wheel 47 and a button 45. The display serves for displaying user information and is optionally touch-sensitive, in order to allow user inputs. As an alternative or in addition, the scroll wheel 47 serves for user input. The button 45, arranged separately on the main body 42 and also of an enlarged form, likewise serves for user input or control, wherein it serves especially for triggering the position determination of the point 28. Once the user has placed the pen 40 on the point 28 in a way suitable for surveying, the user initiates a command to the controller of the surveying system by means of the button, so that the position determination takes place.

The auxiliary measuring instrument 40 or the surveying system is optionally designed to prompt the user during a measuring task, for example to indicate the next action steps or in that a system controller gives instructions to the user via the display 44 in dependence on a continuously ascertained position and orientation of the pen 40, and consequently of the user. As a further optional feature, in the example the auxiliary measuring instrument 40 has a rule 46, with which lengths on the surveying site can be handily measured. In the example, this is designed such that it can be folded out (indicated in the drawing by the arrow 46a).

Figure 8B:
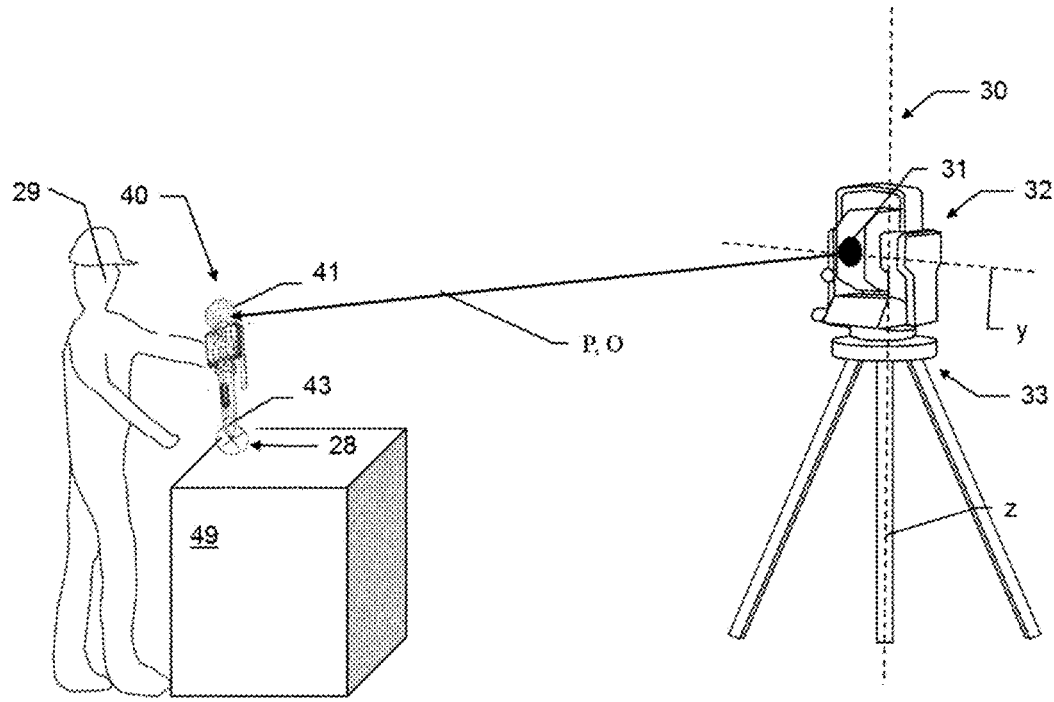

FIG. 8b shows an example of surveying an object point 28 with the aid of the auxiliary measuring pen 40. The pen 40 is ergonomically designed, for example by means of a gripping region for at least the thumb and index finger, and also in particular the middle finger, of a user, in such a way that—like a customary pen—it can be used by the user 29 in a one-handed manner, as shown. In order for example to survey a point of an object 49 in a terrain, for example outdoors or inside a building, a surveying device 30, for example a total station, is positioned in a known way, so that the device 30 can be aligned with the auxiliary measuring instrument 40. The surveying device has a camera 31 that can be pivoted about two axes y, z.

The camera aligned with the auxiliary measuring instrument 40, or to be more precise with its sphere attachment 41, records at least one image of the sphere attachment 41 when the auxiliary measuring instrument 40 designates the terrain point 28, that is to say in the example the user 29 uses his hand to bring the pen 40 onto the point 28, so that the tip of the pen touches the object point 28. By means of image evaluation of the camera image of the sphere attachment 41, the position and orientation of the pen 40 are ascertained. Starting from the known position and alignment of the surveying device 30, the position of the point 28 is ascertained by means of knowledge of the range or position of the auxiliary measuring instrument 40 and its alignment and also the length of the measuring pen 40 (or distance between an internal reference point of the pen 40 and the object point 28).

Here, the tip 43 is optionally designed as a probe which, when it makes contact with or touches the terrain point 28, automatically triggers the position determination or the recording of a camera image of the sphere attachment 41, wherein a corresponding command is output by the auxiliary measuring instrument 40 to a controller of the surveying device 30, for example by means of a Bluetooth connection.

As an alternative or in addition, when it is touched, the probe automatically triggers a measurement. As a further option, automatic triggering of a measurement or of a working operation takes place as soon as the pen 40 has assumed a desired position.

Instead of such a surveying operation, alternatively a desired position on the object 49 is marked by means of the pen, for example in that the tip of the pen is designed as a pen marker, for example in the manner of a felt pen or crayon. Consequently, the measuring pen 40 can also serve for staking out points.

The handy design of the auxiliary measuring instrument 40 in the manner of a pen, which can be easily used with one hand (for which purpose for example the center of gravity of the pen 40 is also situated in such a way that it allows it to be handled with one hand reliably and at least largely without fatigue), offers the advantage of much less laborious handling than conventional auxiliary measuring instruments of the generic type. Moreover, it also allows the marking of terrain points that cannot be reached for example with plumbing poles of the prior art, either because the plumbing pole cannot be positioned perpendicularly on the point as required or because the plumbing pole is too long. By contrast, with the present auxiliary measuring pen 40, on account of the ascertainment of all six of its degrees of freedom, contact can be made in any alignment and, on account of its handy, comparatively small size, even concealed points can be surveyed/marked out. Consequently, surveying operations in the near field or in confined spaces such as corners, casings, wall recesses, bay windows, in furniture etc. are also made possible.

Figure 8C:
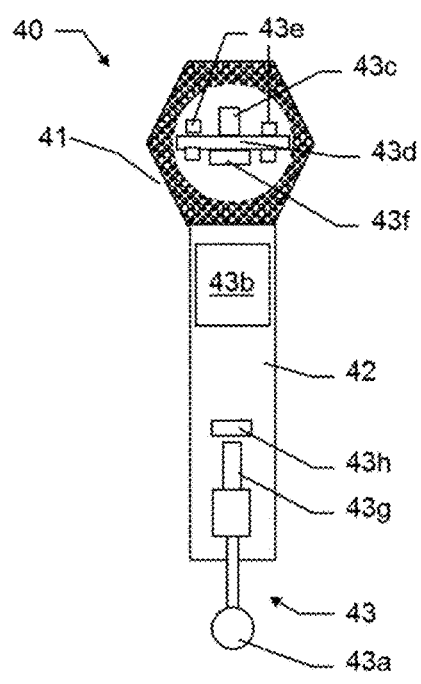

FIG. 8c shows in cross section a further exemplary embodiment of a measuring pen 40. The pen 40 has at its upper end a body 41, in the example configured as a polyhedron. The body 41 is the bearer of a code, which, as previously described, allows image-based determination of the location of the pen 40 by means of an external camera. Inside the body 41 there is a printed circuit board 43d, which in the example is the bearer of an inertial measuring unit (IMU) 43f. The IMU 43f serves for supporting the location determination, for example in order to make the location determination more robust or to bridge dead angles, in which location determination is not possible on the basis of the optical code, for example because the line of sight to the camera is interrupted. Furthermore, the printed circuit board 43d bears a communications module, for example in the form of an IRDA module. Moreover, inside there are four lighting means (LEDs) 43e (two on top and two underneath on the board 43d), whereby the body 41 is designed as a luminaire. The illumination is for example variable, for example in order to indicate the respectively applicable operating state of the pen 40 for example by means of different colors.

Apart from a battery 43b, the pen 40 has at its lower end 43 a probe ball 43a. In the example, the ball can be laterally deflected, so that lateral probing of objects is made possible. When there is such a probe ball 43a, the pen 40 is optionally additionally provided with electronic and/or mechanical correction of the extent of the ball, so that during the ascertainment of the point 28 the size of the ball is automatically taken into account in a corrective manner. In the example, the deflection of the probe ball 43a is measured by means of magnets 43g coupled to the probe ball 43a, which are detected by a Hall element 43h. As an alternative, a piezo element serves for determining the deflection.

Figure 8D:
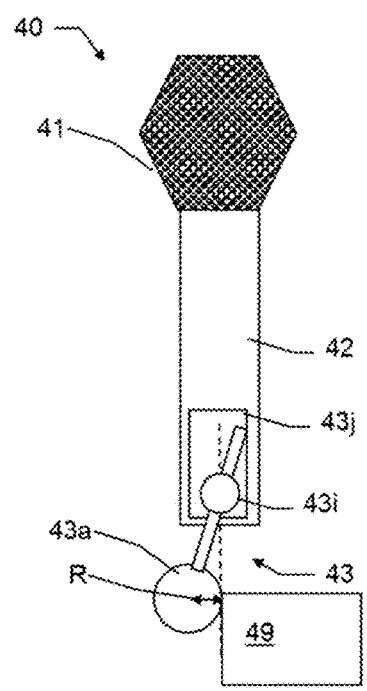

FIG. 8d shows a further embodiment of a pen 40 with a probe ball 43a. The probe ball 43a is arranged by means of a ball joint 43i in a mount 44j in the lower end 43 of the pen 40 in such a way that, during a measurement of a point of an object 49, the ball 43a is deflected exactly by the radius R of the ball. There is consequently a correction of the extent R of the ball 43a, in that a measured-value recording of an object point takes place precisely when the deflection caused by the probing of the object 49 corresponds to the ball radius R. This is ensured by the mechanical arrangement of the probe ball 43a.

FIG. 9a shows a further embodiment of a pen-like auxiliary measuring instrument 40. In the example, the auxiliary measuring instrument 40 has an exchangeable tip 43. This can be fitted on the main body 42 of the pen 40 by means of a holder 50 and removed again. In this way, various types of ends or tips 43 can be advantageously used, so that the functional scope of the auxiliary measuring instrument 40 can be extended in comparison with a fixed tip. For example, a purely marking tip, such as for example a felt pen tip, can be exchanged for a sensor tip, or a tool tip can be fitted. Also possible of course as an option are embodiments with more than one tip or more than one tool or sensor, which may be exchangeable or fitted in a fixed manner.

FIGS. 9b-9d show three examples of possible tip models. FIG. 9b shows a tip that is designed as a line laser 52. This allows laser lines to be indicated by means of the pen 40, for example on the wall of a building in the course of construction work.

FIG. 9c shows a further example of a tool tip. This is designed in the example as a spray tip 54, so that paint from a tank 55 can be applied by means of the pen 40, for example to the wall of a building, for example in order to mark layout geometries.

FIG. 9d shows a metal detector 53 as an example of a sensor tip, so that metals can be detected with the auxiliary measuring instrument 40.

The button 45 shown in FIG. 9a is optionally provided in the case of an active tip, such as for example one of the tips 52, 53 or 54, in order to trigger the respective function of the tip. For example, therefore, by actuating the button 45, a spraying operation with the spray tip 54 is triggered or the metal detector 53 is activated.

As a further option, shown in FIG. 9a, the holder 50 has a means 51 by which the respectively attached tip can be automatically identified. For example, as shown, there are electrical contacts 51, which have a corresponding counterpart on the tip 43 that identifies the respective tip 43, for example an ID chip. As a further example, the identification is performed optically by means of, in that for example an optical coding, such as for example a barcode, which is provided on the respective tip in the holding region, can be read by means of an optical unit 51. In the course of the identification, a transmission of the size/length of the tip takes place, so that the actual length of the pen is automatically taken into account during the ascertainment of the measurement results.

As a further option that is not shown, the holder 50 is provided in order to be able to receive extension pieces. Therefore, extension parts can be exchangeably fitted between the main body 42 and the tip 43, so that the length of the pen 40 is variable. This allows for example the length of the pen 40 to be adapted to different measuring tasks, for example increased in order to reach points in a relatively deep depression. As an alternative to such extension pieces that can be fitted, the length of the instrument 40 or its body 42 may be variably designed, in that the main body 42 is designed as a kind of telescopic pole. The tip 43 is consequently then retractable and extendable, particularly advantageously in a stepless manner. This may for example be performed by the user, in that the user turns the wheel 47a.

FIG. 9e shows a further example of a tip. This tip 56 has a measuring tape 57, which is secured in such a way that it can be wound up in a receiving container 59 attached to the tip 56. The receiving container 59 is either fixedly attached to the tip 56 or—in particular in the case of a non-exchangeable pen tip—removably fitted on the tip 56. The length of the measuring tape 57 is therefore variable, wherein the container 59 has an arresting mechanism (not shown), with which a chosen length of the measuring tape 57 can be set. The measuring tape 57 serves for example for manually measuring out distances from the point 28 contacted by the tip to a point in its vicinity. As an alternative or in addition, the end of the measuring tape 57 has, as shown, a marking means or a holder for such a marking means, so that for example, as shown, a pencil 58a can be connected to the measuring tape 57, and consequently the tip 56. Once the measuring tape 57 has been arrested, for example a circle or an arc of a circle 58 can therefore be drawn by the user, for example on a wall of a building, wherein the center point of the circle then lies on the longitudinal axis 48 (see FIG. 4a). Such staking out of a circle serves for example for marking a circular area in which a specific manual construction activity is intended to take place.

Figures 10A, 10B:
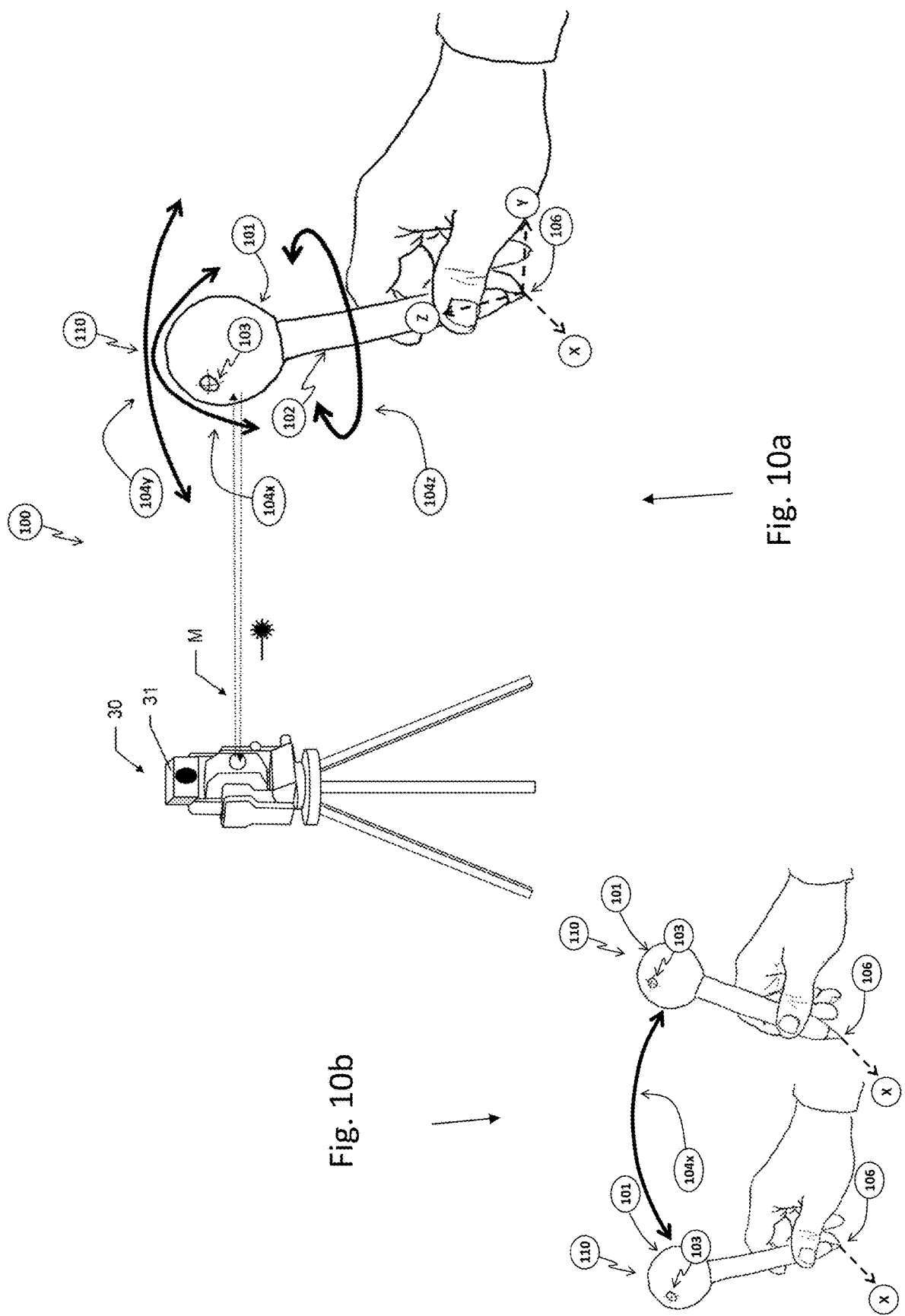

FIGS. 10a,b show a surveying system 100 for surveying and/or staking out object points, with a surveying device 30, for example a total station, and an auxiliary measuring instrument 110, which in the example is designed as a measuring pen. The auxiliary measuring instrument 110 has an elongate main body 102 with a contact end 106, with which a surface point of an object to be surveyed or marked/staked out can be contacted, by the pen 110, and consequently the tip of the pen 106, being manually guided onto the point. Attached to the main body 102 at its other end is a body 101, in the example a sphere. The sphere 101 has optical features 103, only one of which is illustrated for the sake of simpler and clearer representation. In fact, the features 103 are preferably distributed over the entire visible or accessible surface of the body 101 and form an optical, two-dimensional, that is to say area-like, code (or a number of codes).

The optical features 103 or the 2D code is/are designed in such a way that at least the orientation or alignment of the body 101, and consequently of the auxiliary measuring instrument 110, can be determined, in particular bijectively determined, on the basis of a camera image of the body 101, which in the example is recorded by means of a camera 31 of the total station 30, and consequently an imaging of at least part of the 2D code. Optionally, a range from the auxiliary measuring instrument 110 may be additionally measured here opto-electronically by the surveying device 30, for example by means of laser radiation M. In preferred embodiments, the orientation and range of the body 101, and based on that the location of the auxiliary measuring instrument 110, can be completely determined from the 2D code and from the stored decoding information, for example by the (viewing) direction with respect to the body 101 associated with the range-finding distance measurement being measured by means of an angle encoder of the total station, and consequently all six degrees of freedom are determined.

A position of the object point to be surveyed can consequently then be inferred from the orientation or location of the auxiliary measuring instrument 110. In particular, exact point measurements are consequently possible at least largely independently of the position or attitude of the pen 110, so that uncomplicated handling or use of the auxiliary measuring instrument 110 is made possible (for example surveying without the necessity of keeping the pen 110 vertical).

For determining the location of the auxiliary measuring instrument 110, for example the positions of the captured features 103 in the camera image are evaluated by using surface-position information and/or rotation matrices stored in the system 100 as decoding information, and from this a location of the body 102 is assigned to the captured feature positions depicted in the image.

In order then to minimize or compensate for deviations from the assigned location, or to put it another way the location determined in the way described from the actual location of the body 102, the system 100 has calibrating functionality.

For performing the calibrating functionality, as represented in the figure, the contact end 106 of the measuring pen 110 is fixed on a point. In other words, the contact end 106 is at rest. The pen 110, and consequently the body 101, is pivoted about this point of rest in at least one spatial direction—in the example of FIG. 10*b* by rotation about the x axis (rolling)—or as indicated in the example of FIG. 10*a* all spatial directions x, y, z. Therefore, rotational movements 104*x*, 104*y* and/or 104*z* are manually generated by the user.

Consequently, the body 101 moves on a circular arc (pivoting only about the x axis or the y axis) or a calotte (when pivoting about the x axis and y axis). Images of this movement are recorded by means of a fixed camera, for example the camera 31 of the surveying device 30, so that the body 101 is depicted in a number of target positions, and consequently the 2D code 103 is depicted in a number of different locations on the circular arc or the calotte.

Figure 11B:
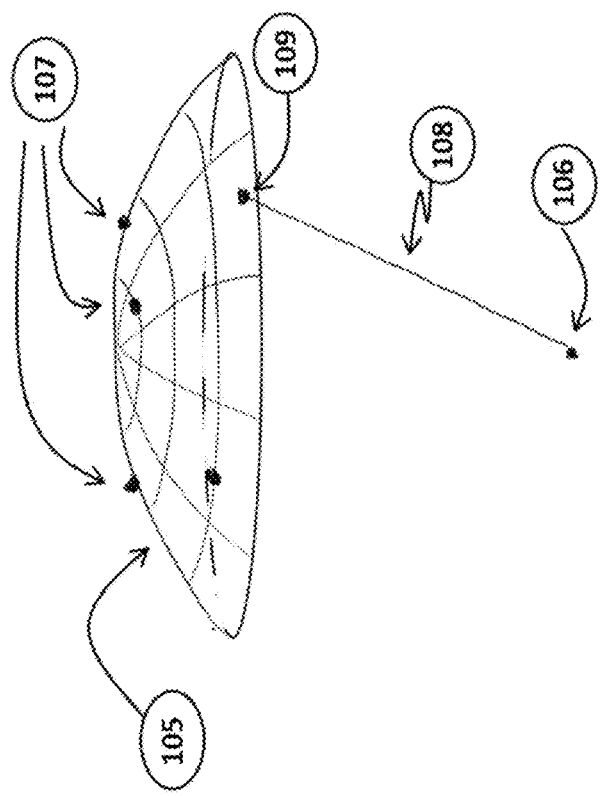
Figure 11A:
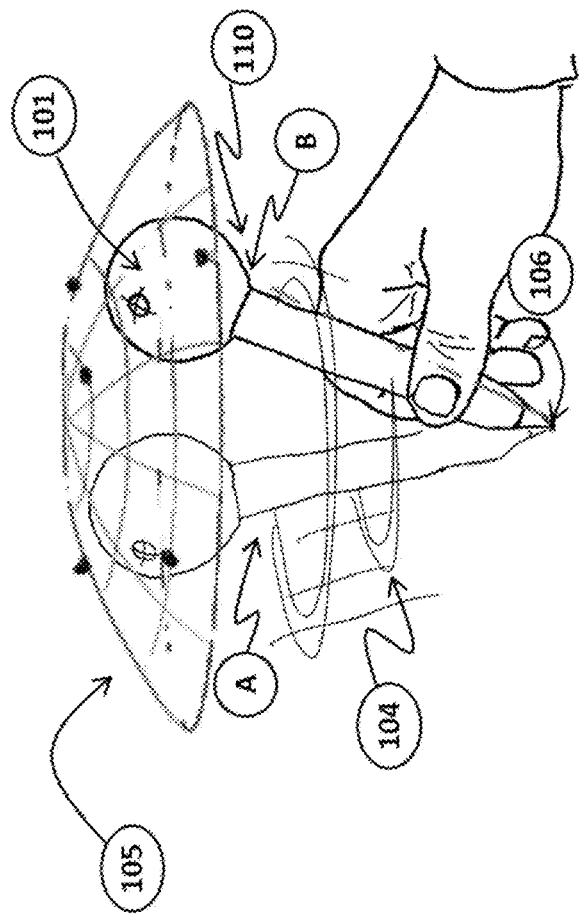

FIGS. 11*a,b* show by way of example a calotte 105, which is generated by the rotation 104 of the measuring pen 110 about the fixed, resting contact end, and consequently midpoint of the sphere 106. Of the various rotational positions of the auxiliary measuring instrument 110, and consequently locations of the body 101 on the calotte 105 (or possibly circular arc), two locations A and B are illustrated by way of example in FIG. 11*a*.

As part of the calibrating method, camera images, which depict at least two different pivoting locations 107 of the body 101, for example therefore the two locations 107A, 107B on the one calotte that are denoted in the image by A, B, are then evaluated. On the basis of the 2D code captured in these images and the stored decoding information, an orientation of the body 101 (and possibly also a position), can be respectively assigned to these locations 107. Against the background that, as required, these pivoting locations 107 lie on a circular arc or, as in the example, on a calotte, or to put it another way have a pivot point or fulcrum in common with the fixed point 106, a vector between the body or its midpoint and the pivot point (contact end) 106 in a respective location 107 can be ascertained from the orientation determined by means of the 2D code. At least two such ascertained vectors, in the example the vectors 108A, 108B, are used for calibrating the decoding information.

To put it another way, the turning movement about the fixed or fixed-in-place end 106 defines a constraint or generates additional information, which is used together with the alignment respectively ascertained on the basis of the 2D code to compensate for deviations of an actual state of the 2D code/features 103 or auxiliary measuring instrument 110 from a desired state. As a result of the orientation, which in a respective location 107 is available from the 2D code, two vectors 108A, 108B are already sufficient to perform the calibration. Imperfections of the measuring pen 110 and the 2D code can consequently be determined and compensated by being correspondingly taken into account in the decoding as part of a following object surveying operation.

In addition to the data obtained from the camera images of the pivoting locations 107A, 107B, preferably a range is measured electro-optically in relation to at least one of the various locations 107A, 107B. As illustrated in FIG. 10*a*, at least one distance with respect to at least one location 107A, B is therefore determined by means of measuring radiation M in a way known per se by the surveying device 30. This measured value is then used as further information on the calibration. As a result, for example the calibrating accuracy can be increased and/or the image processing simplified, for example by it being possible for the number of required camera images or different attitudes to be reduced in comparison with calibration without a measured distance value.

In particular, but not only, in variants with the electro-optical distance measurement described, the surveying device 30 is optionally automatically aligned continuously with the moved body 101. Thus, for example, the body 101 or a segment of it can be kept at the respective centre of the camera images. Such target-tracking functionality is in this case based for example on an evaluation of camera images of the sphere in which a midpoint of a circle is derived from a geometrical fit of a circle.

Also using the image-based evaluation of the various pivoting locations, and possibly one or more measured distance values, as a basis, a variable or dimension, preferably the length of the auxiliary measuring instrument 110, may also be ascertained or its already stored value calibrated. The length may in this case, as represented in FIG. 11*b*, be understood for example as the length of the vector or distance 108A or 108B between the tip of the pen 106 and the midpoint of the sphere 109 as a further reference point.

In other words, therefore, as part of the calibrating method, the hand-held measuring stylus 110 with a body 101 designed as a spherical encoder by means of optical features is turned about a point 106 in at least one spatial direction x, y, z for ascertaining an attitude; in particular, the rolling angle and/or the angle of inclination varies. During this, the optical features 103 of the body 101 are captured by a camera 31 and are optionally supplemented by an electronic measurement of the distance to the body 101 or some other target arranged in a defined way of the instrument 110 (for example a retroreflector). The rotation spans a circular arc (see FIG. 10b) or a calotte 105 (see FIG. 11a), on which there lie the individual centroids 107, which have been derived by a mathematical model from the optical features 103 and optionally the electronic distance measurement. This circular arc or this calotte 105 has its origin or midpoint in the tip 106 and has a radius 108, which can be understood as the length of a vector 108A, B from the midpoint of the body 101 to the midpoint of the circle/sphere 106. At least two such connecting lines 108A, B, which extend from the midpoint of the body 107 and all intersect/meet at the fixed pivot point 106 and are associated with various locations 107, are determined on the basis of the decodable orientation of the body 101. The final calibration of the stored decoding information takes place against the background of the underlying defined restriction of the degrees of freedom of movement by the pivoting movement with a fixed radius and rotation point 106 on the basis of an evaluation of the at least two vectors 108A, B.

In the calibration of the decoding information, preferably rotation matrices are determined, defined by the optical features 103 and the mathematical model underlying them. Such rotation matrices serve in particular for the determination of angles of inclination and rolling angles. It is consequently optionally also possible for the length of the auxiliary measuring instrument 110, that is to say a stylus that can be used with one hand as depicted or else a plumbing pole, to be calibrated.

Such a length calibration is advantageous especially in the case of embodiments of the auxiliary measuring instrument 110 that do not have a once-defined or fixed length 108, but the length of which is variable. A variable length is provided for example by pole-shaped extension pieces and/or telescopic mechanisms. Once a new length has been set, it can then be fixed by means of the proposed process. Since such a changing of the length can especially also have an influence on rotation about the x axis and y axis (tilting angle and rolling angle) and consequently can have the ascertainable vectors 108A, B, optionally deformations or imperfections of the instrument that have an effect on the length, such as runout errors (eccentrics) of a plumbing pole, are also detected or calibrated, and consequently compensated, as part of the method.

In a further development of the calibrating method, the 2D codes captured with respect to rotating locations 107A, B and the associated decoding information are used in order to calibrate a position and/or orientation sensor, such as for example an inertial measuring unit (IMU), that is optionally present. For example, an inclination sensor which is fitted in the measuring pen 110 and the data of which are additionally used for the surveying of an object, can be calibrated in this way.

The method for calibrating the auxiliary measuring instrument 110 or the optical 2D code with the aid of the described rotational movement offers the advantage that on the one hand the requirements for the accuracy of the positioning of the code on the body 102 can be kept lower or, with unchanged quality requirements, a more precise determination of the orientation or position of the auxiliary measuring instrument 110, and consequently of an object point, is made possible. The proposed method can correspondingly be used as a calibration carried out by the manufacturer before delivery. The method may also be used in the field or by a user, for example at regular intervals or after the surveying system 100 or the auxiliary measuring instrument 110 has been subjected to unusual loads. Consequently, consistent surveying quality can be ensured in spite of external influences, and for example ageing of the device can be counteracted.

Some surveying systems 100 include optional state monitoring, which checks the state of the instrument 110 continuously, periodically or after shock events, and possibly recommends a user to carry out the calibrating method. For example, in embodiments with a variable length of the instrument 110, such changing of the length in which at least an approximate length of the auxiliary measuring instrument 110 thereby ascertained is checked with regard to a tolerance value being exceeded can be detected by the user of the system 100, for example on the basis of spherical-cap or vector measurements running in the background. It can in this way be prevented for example that setting of a new pen length by the user unintentionally goes unnoticed by the system 100.

As a further option, as part of the calibrating functionality, an instruction with respect to pivoting the auxiliary measuring instrument for generating the various locations of the body 101 on the calotte is displayed to a user on a user display, which is for example arranged on the measuring pen 110, in particular with regard to an optimum arrangement of the locations 107 for the calibration. Such an instruction is based for example on an image that is recorded by the camera 31 and shows the auxiliary measuring instrument and its surrounding area. For example, a zone within which the body 101 should move, or conversely a region that is to be left out, for example because it cannot be seen from the total station 30, is thus graphically marked for the user. Individual rotational positions or attitudes A, B of the auxiliary measuring instrument 110 or of the sphere 101 that are to be generated by the user may also be graphically indicated. The user's perspective of the auxiliary measuring instrument 110 and/or its location may be indicated here on the display. Also, such a display or other man-machine interface may also be used to issue a warning to the user if the determination of body locations 107 on the circular arc or the calotte is deficient or impossible.

The method is in this case not restricted to the system 100 given by way of example, with a pen-like instrument 110, but is in principle suitable for similarly designed auxiliary measuring instruments with the object points of which contact can be made for surveying purposes, for example plumbing poles, as are known in principle from geodesy, and which are provided with a body as described above with a 2D code that can be optically captured.

The described pivoting movement can also be additionally used advantageously for surveying or staking out by means of the 2D code with the auxiliary measuring instrument itself. Then, along with the location information obtained from the (calibrated) 2D code, the information that can be obtained for example from a number of spherical-cap locations 107 of the body is additionally used for the determination of the object point. Consequently, in a way similar to when calibrating, the auxiliary measuring instrument is pivoted about the object point, the object point concerned being contacted by the measuring tip at rest. In addition to the various locations of the body thus generated and measured by means of code evaluation, the rotation constraint is also taken into account in order to determine the position of the object point. Such linking of the 2D code measurement (and possibly an additional electronic distance measurement) with for example a calotte allows the measuring precision during the surveying to be increased.

It is obvious that these illustrated figures only schematically represent possible exemplary embodiments. The various approaches can also be combined according to the invention with one another and with surveying devices and surveying methods of the prior art.

What is claimed is:

1. A calibrating method for an auxiliary measuring instrument which is designed to form together with a ground-based, stationary, surveying device having range-and-direction measuring functionality, a total station, a system for surveying and/or staking out object points,
   the auxiliary measuring instrument having an elongate main body designed for manual handling, so that an object point can be contacted by a user with a contact end of the auxiliary measuring instrument,
   the auxiliary measuring instrument having a body, in particular a sphere, at a further end of the main body at a fixed distance from the contact end, in particular with the centre of the body arranged on the longitudinal axis of the main body,
   the body having on its surface an optical 2D code, which is designed in such a way that an orientation, a position, of the body, and consequently of the auxiliary measuring instrument, can be determined by image processing of a camera image of at least part of the 2D code on the basis of stored decoding information,
   the method comprising:
      contacting an object point with the contact end,
      pivoting the auxiliary measuring instrument about the resting contact end, resulting in a movement of the body which, because of the resting contact end and the fixed distance from the contact end, is subject to such a defined constraint,
      during which, optical capturing by means of camera images of at least part of the body, and consequently of the 2D code, so that various pivoting locations of the body are captured,
      image-processing evaluation of the captured 2D code in at least some of the camera images in which at least two of the various pivoting locations of the body are depicted, for ascertaining the respective orientation of the body on the basis of the 2D code,
      determining at least two vectors, associated with the at least two pivoting locations, from a reference point, in particular a midpoint, of the body to the contact end on the basis of the said constraint of the body movement from the respective ascertained orientation of the body,
      calibrating the stored decoding information on the basis of the at least two vectors.

2. The method according to claim 1, wherein the decoding information comprises rotation matrices in relation to at least two turning angles, in particular pitching and rolling angles.

3. The method according to claim 1, wherein deviations of code markings from a desired or ideal position on the body and/or of at least one dimension of the auxiliary measuring instrument, in particular its length, from a desired or ideal dimension are compensated by the calibration.

4. The method according to claim 1, wherein the 2D code is designed in such a way that an orientation and range of the body, and based on this the location of the auxiliary measuring instrument, can be completely determined by image evaluation of a camera image of the 2D code and on the basis of the stored decoding information.

5. The method according to claim 1, wherein the auxiliary measuring instrument has a position and/or orientation sensor, and, as part of the method, a calibration of the position and/or orientation sensor takes place on the basis of the constraint by using the captured 2D code.

6. The method according to claim 1, wherein at least in relation to one of the various pivoting locations, a range from the auxiliary measuring instrument, in particular directly from the body, that is linked or can be linked with the location of a camera capturing the camera images is measured and used in the calibration.

7. The method according to claim 1, wherein the length of the auxiliary measuring instrument is corrected or determined on the basis of at least some of the camera images recorded during the pivoting movement, in particular as the distance from a reference point, in particular the midpoint of the body, of the auxiliary measuring instrument to the contact end.

8. A ground-based surveying system for surveying and/or staking out object points, with a stationary surveying device having range-and-direction measuring functionality, a total station, and an auxiliary measuring instrument,
   the system comprising a camera,
   the auxiliary measuring instrument comprising:
      an elongate main body, designed for manual handling, so that an object point can be contacted by a user with a contact end of the auxiliary measuring instrument,
      at a further end of the main body, at a fixed distance from the contact end, a body, a sphere with the centre of the body arranged on the longitudinal axis of the main body, and the body having on its surface an optical 2D code, which is designed in such a way that an orientation and also a position, of the body, and consequently of the auxiliary measuring instrument, can be determined by image processing of a camera image of at least part of the 2D code on the basis of stored decoding information, and
   the surveying system having calibrating functionality, when performing which:
      camera images in which at least two different pivoting locations of the body are captured are recorded by the camera, the locations being provided by pivoting the auxiliary measuring instrument about the resting contact end, resulting in a movement of the body which, because of the resting contact end and the fixed distance from the contact end, is subject to such a defined constraint, and
      by means of image processing, the 2D code captured in the camera images is evaluated for ascertaining the respective orientation of the body on the basis of the 2D code,
      on the basis of the said constraint of the body movement, at least two vectors,
      associated with the at least two pivoting locations, from a reference point which is a midpoint, of the body to the contact end are determined from the respective ascertained orientation,
      a calibration of the stored decoding information takes place on the basis of the at least two vectors.

9. The surveying system according to claim 8, wherein the surveying system has automatic state monitoring, which, dependent on the state of the surveying system, suggests a performance of the calibrating functionality to a user.

10. The surveying system according to claim 8, wherein as part of the calibrating functionality, any deformation of the auxiliary measuring instrument of its longitudinal axis, is established, quantified and/or compensated.

11. The surveying system according to claim 8, wherein the length of the auxiliary measuring instrument is variable in a defined way:
- by the main body having a holder for receiving pole-shaped extension pieces, and/or
- by the main body being telescopically designed, so that its length is variable steplessly,
- and, when performing the calibrating functionality, the current length of the auxiliary measuring instrument is verified or ascertained.

12. The surveying system according to claim 8, wherein the surveying device has a drive for automatically changing a target direction and target-tracking functionality, so that, as part of the calibrating functionality, the target direction automatically follows the moving body.

13. The surveying system according to claim 8, wherein the surveying system is designed in such a way that, as part of the calibrating functionality, an instruction with respect to pivoting the auxiliary measuring instrument for generating the various pivoting locations of the body is displayed to a user on a display with regard to optimum arrangement of the pivoting locations.

14. The surveying system according to claim 8, wherein as part of the calibrating functionality, an automatic ending of the capturing of pivoting locations of the body takes place as soon as a predefined termination criterion is satisfied in a desired calibrating accuracy has been achieved and/or a minimum number of feature positions has been determined.

15. The surveying system according to claim 8, wherein the auxiliary measuring instrument is designed as a measuring pen that can be used with one hand.

16. The surveying system according to claim 8, wherein when performing the calibrating functionality, a range from the auxiliary measuring instrument directly from the body, is automatically measured by the surveying device by means of measuring radiation, in relation to at least one of the various pivoting locations, and is used in the calibration.

17. A computer program product with program code, which is stored on a machine-readable carrier, for performing the method according to claim 1.

* * * * *